(12) United States Patent
Ogata et al.

(10) Patent No.: US 9,507,131 B2
(45) Date of Patent: Nov. 29, 2016

(54) TELECONVERTER AND IMAGE PICKUP SYSTEM USING THE SAME

(71) Applicant: OLYMPUS CORPORATION, Tokyo (JP)

(72) Inventors: Yasuji Ogata, Tokyo (JP); Yasuharu Yamada, Kanagawa (JP)

(73) Assignee: Olympus Corporation, Tokyo (JP)

( * ) Notice: Subject to any disclaimer, the term of this patent is extended or adjusted under 35 U.S.C. 154(b) by 138 days.

(21) Appl. No.: 14/618,329

(22) Filed: Feb. 10, 2015

(65) Prior Publication Data
US 2015/0226943 A1    Aug. 13, 2015

(30) Foreign Application Priority Data

Feb. 10, 2014 (JP) .................................. 2014-023339

(51) Int. Cl.
G02B 15/12 (2006.01)
H04N 5/225 (2006.01)

(52) U.S. Cl.
CPC ............. *G02B 15/12* (2013.01); *H04N 5/2254* (2013.01)

(58) Field of Classification Search
CPC ............................ G02B 15/12; H04N 5/2254
USPC ........................................................ 359/745
See application file for complete search history.

(56) References Cited

U.S. PATENT DOCUMENTS

| | | | |
|---|---|---|---|
| 5,745,306 A * | 4/1998 | Sato ..................... | G02B 13/02 359/557 |
| 7,411,745 B2 * | 8/2008 | Wada .................... | G02B 27/646 359/745 |
| 7,593,163 B2 | 9/2009 | Yamada et al. | |
| 8,223,436 B2 | 7/2012 | Sugita et al. | |
| 2013/0155294 A1 * | 6/2013 | Kai ....................... | G02B 15/14 348/240.3 |
| 2013/0308034 A1 | 11/2013 | Ogata | |

FOREIGN PATENT DOCUMENTS

| | | |
|---|---|---|
| JP | 2004-226648 | 8/2004 |
| JP | 2005-107261 | 4/2005 |
| JP | 2009-080176 | 4/2009 |
| JP | 2011-081111 | 4/2011 |
| JP | 2013-235217 | 11/2013 |
| JP | 2013-250291 | 12/2013 |

* cited by examiner

*Primary Examiner* — Bumsuk Won
*Assistant Examiner* — Grant Gagnon
(74) *Attorney, Agent, or Firm* — Andrews Kurth Kenyon LLP

(57) ABSTRACT

A teleconverter according to the present invention includes a master lens apparatus side mount portion, an image pickup apparatus side mount portion, and a converter lens section having a negative refractive power as a whole. The converter lens section includes in order from an object side to an image side, a first lens unit having a positive refractive power, a second lens unit having a negative refractive power, and a third lens unit having a positive refractive power. The second lens unit is a lens unit in which, three lenses are cemented, and which includes in order from the object side to the image side, a first lens having a negative refractive power, a second lens having a positive refractive power, and a third lens having a negative refractive power. The teleconverter satisfies predetermined conditional expressions.

24 Claims, 14 Drawing Sheets

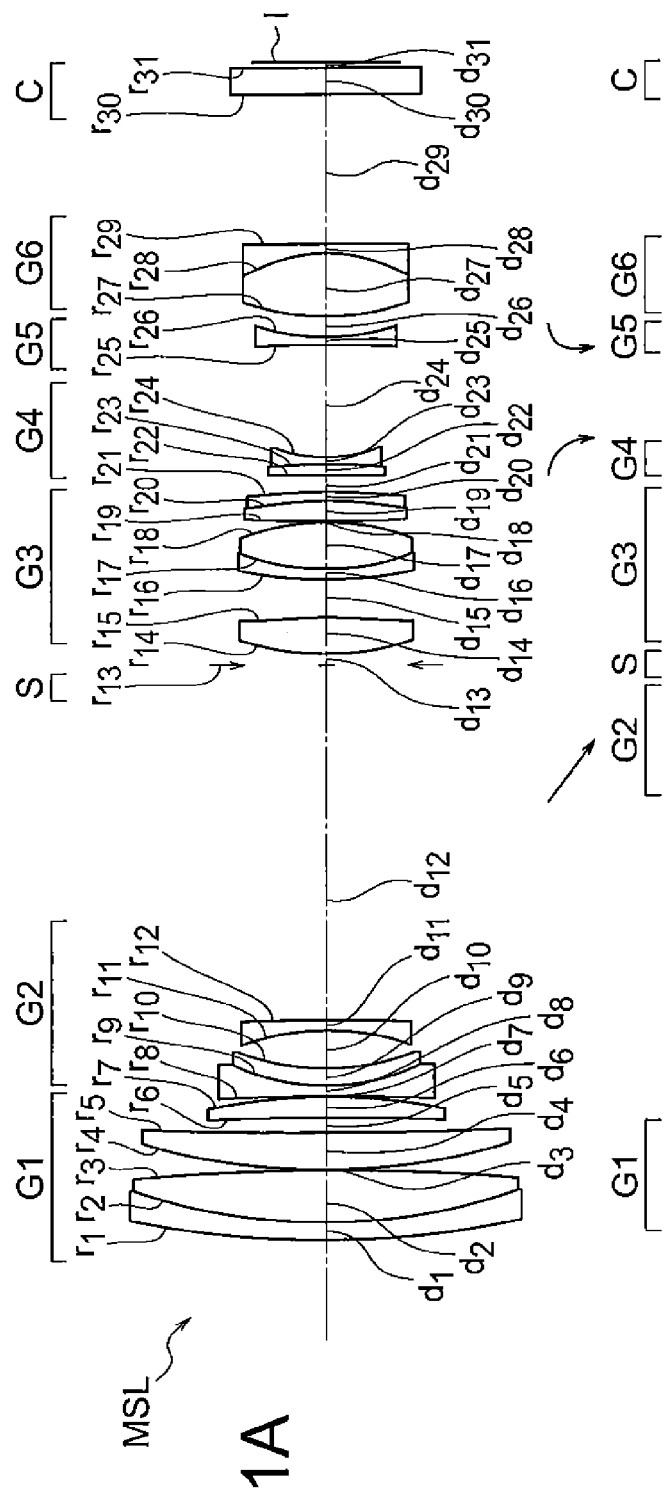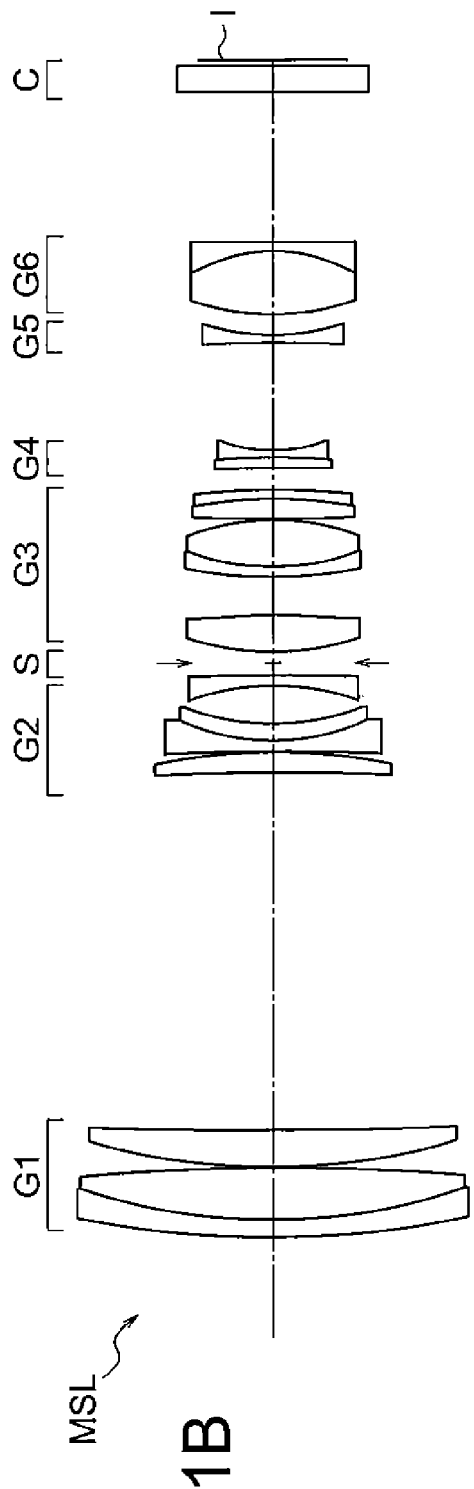
FIG. 1A
FIG. 1B

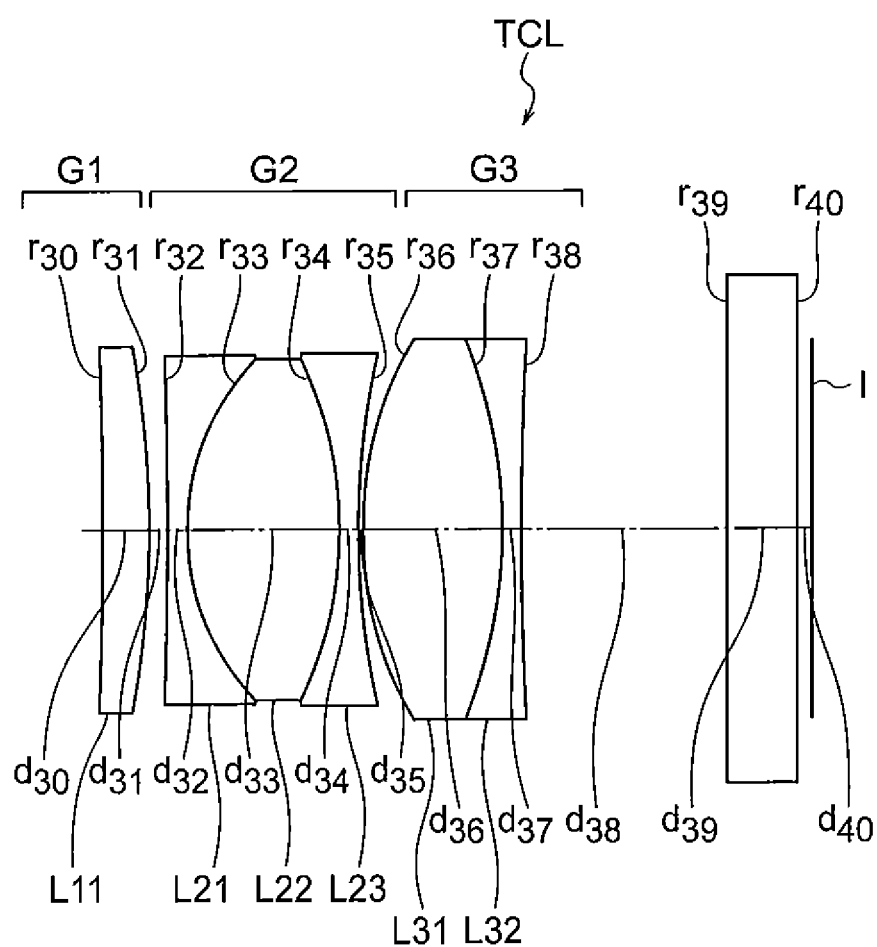

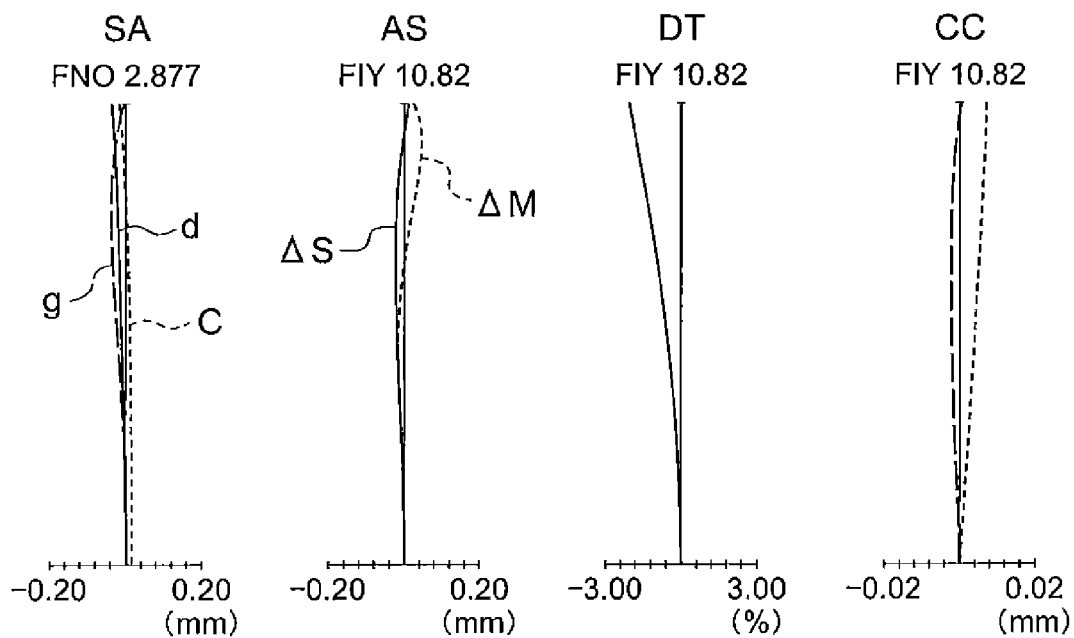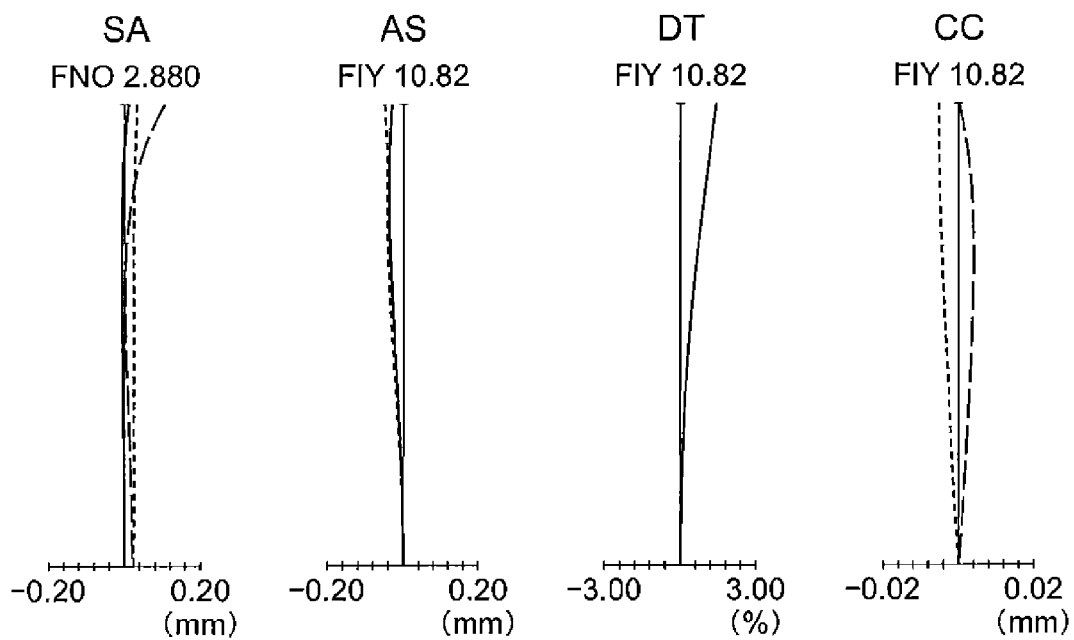

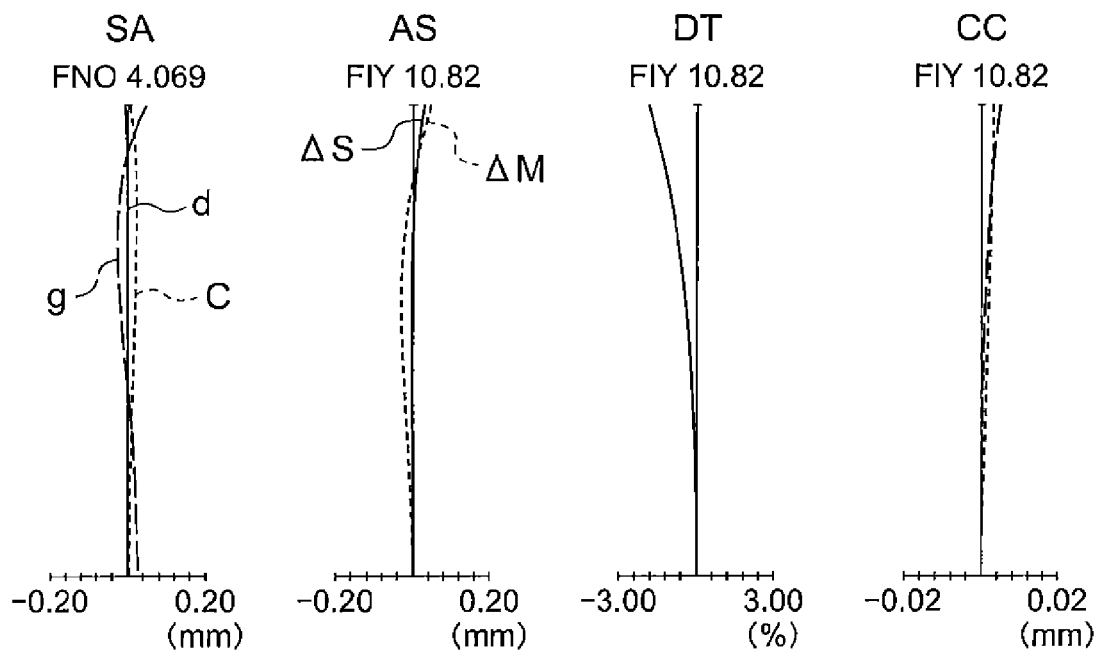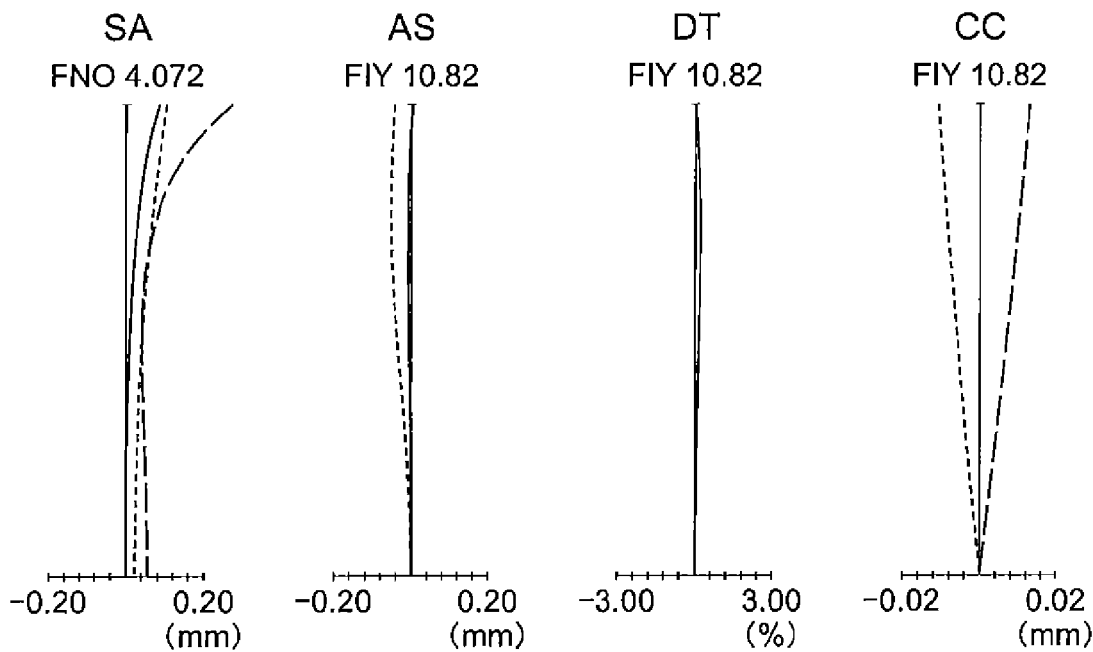

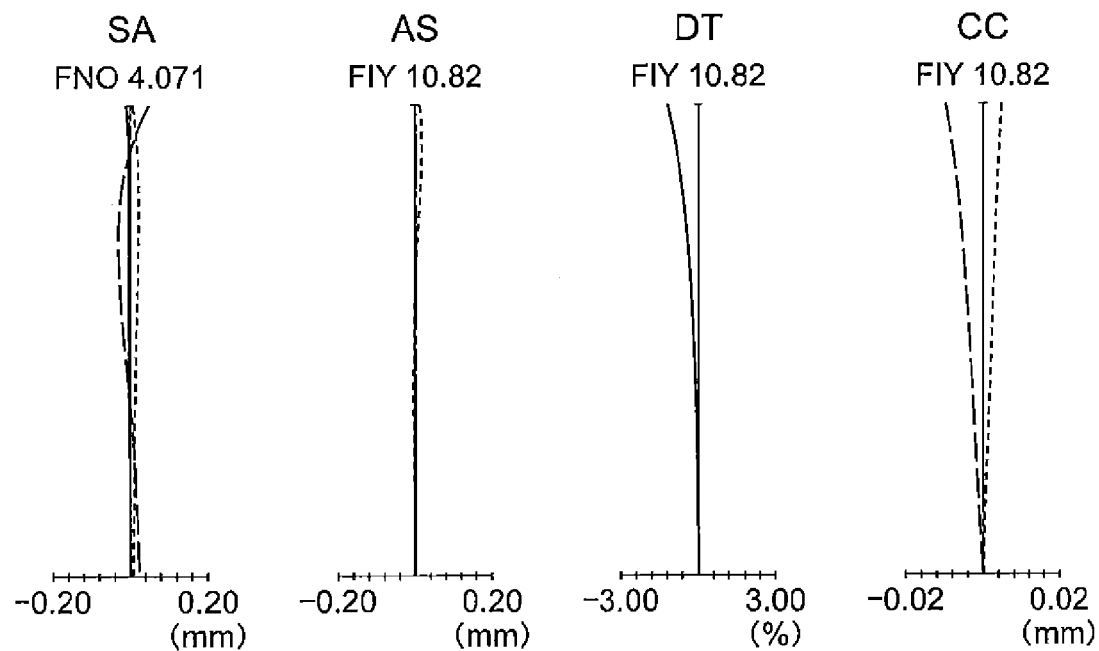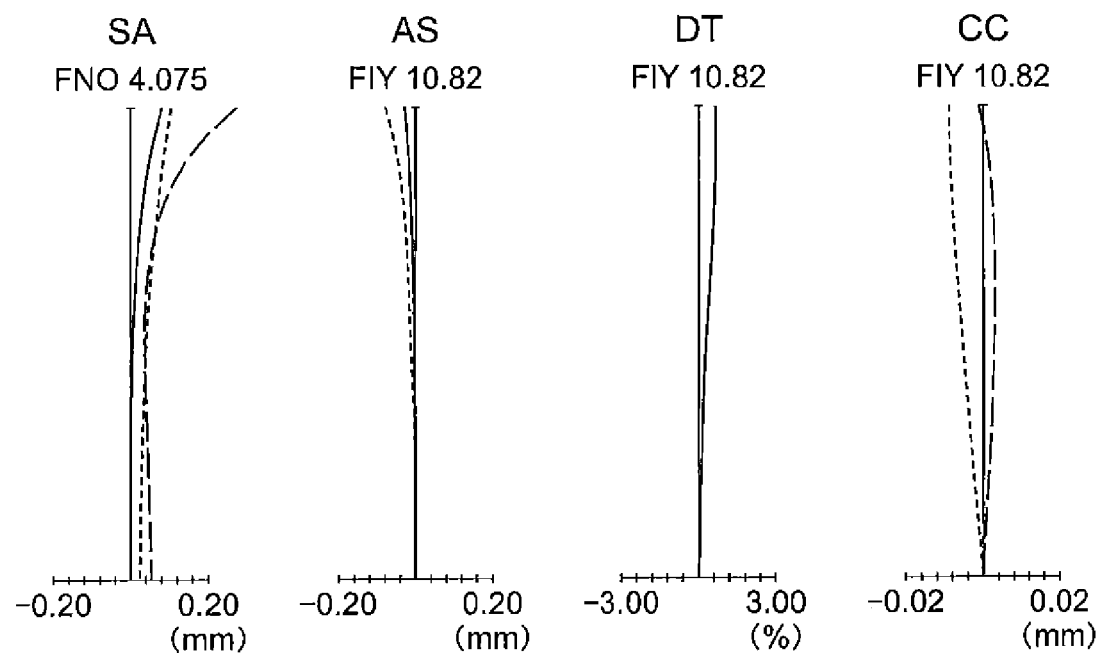

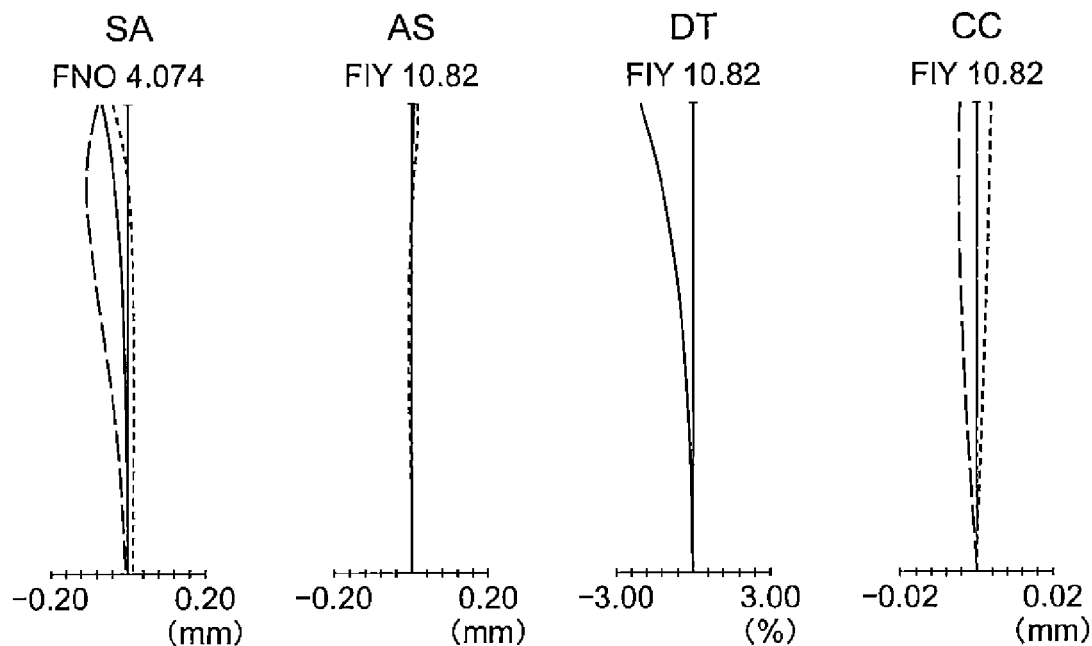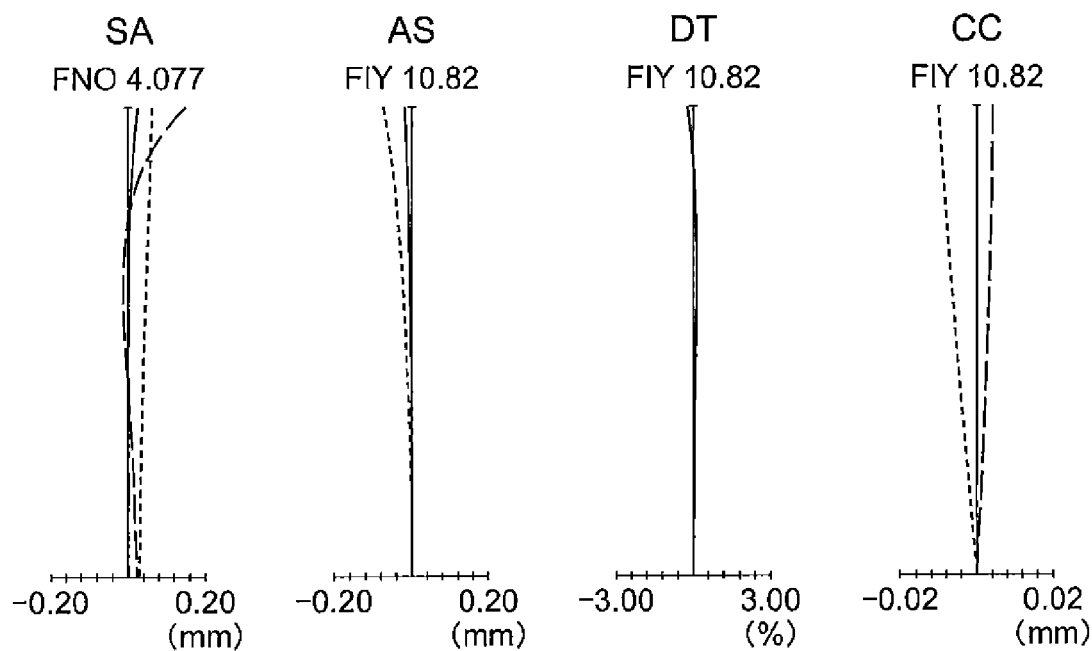

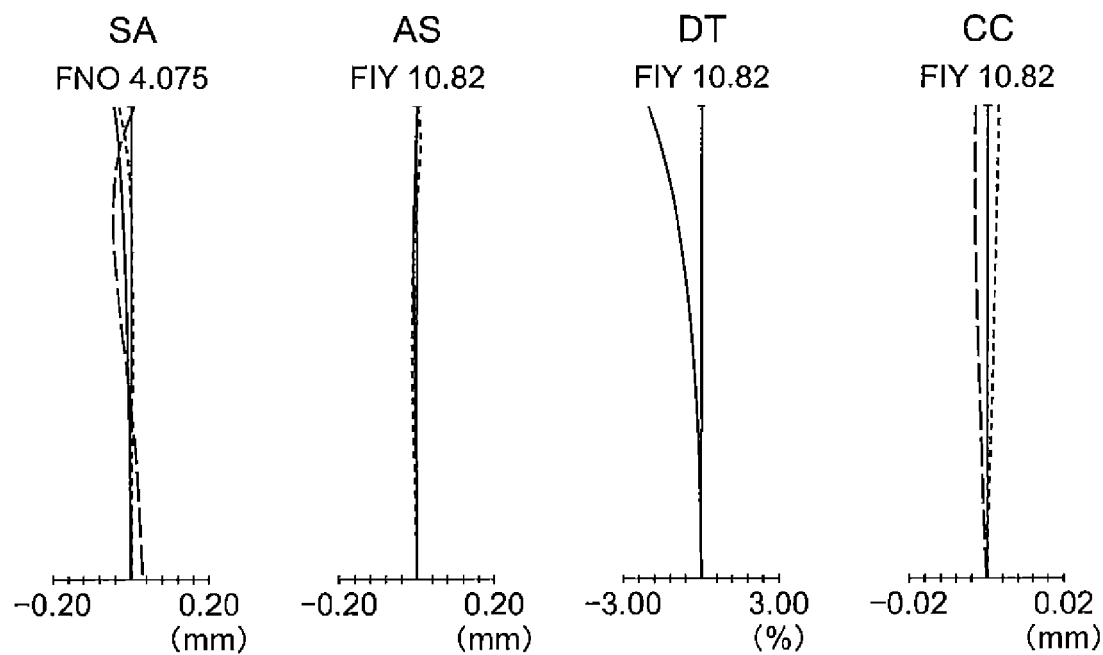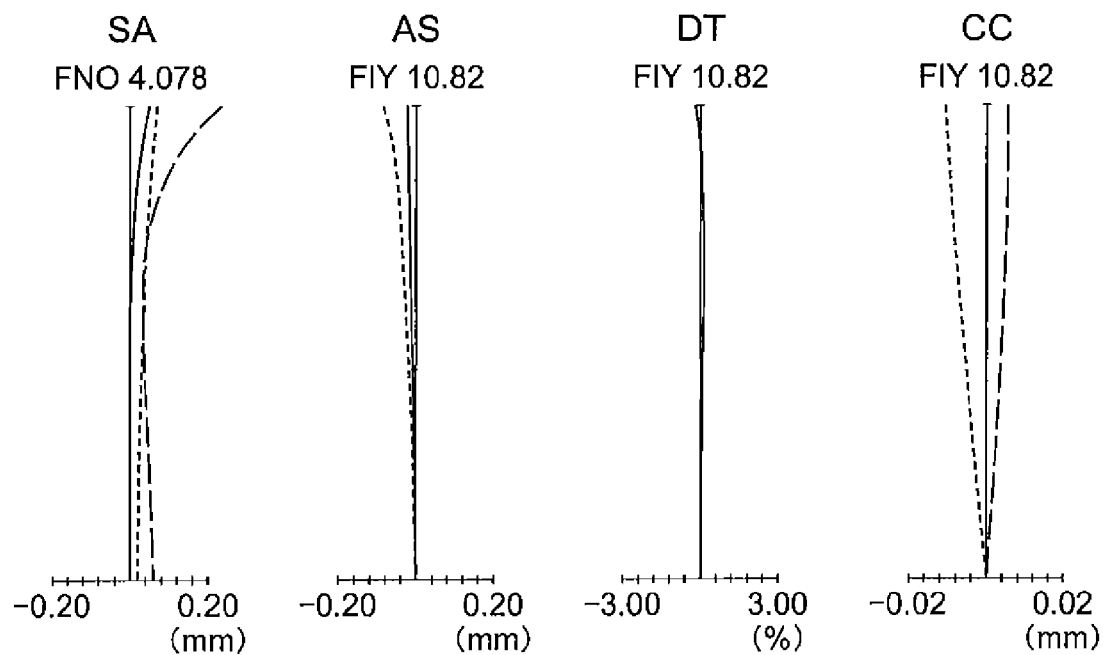

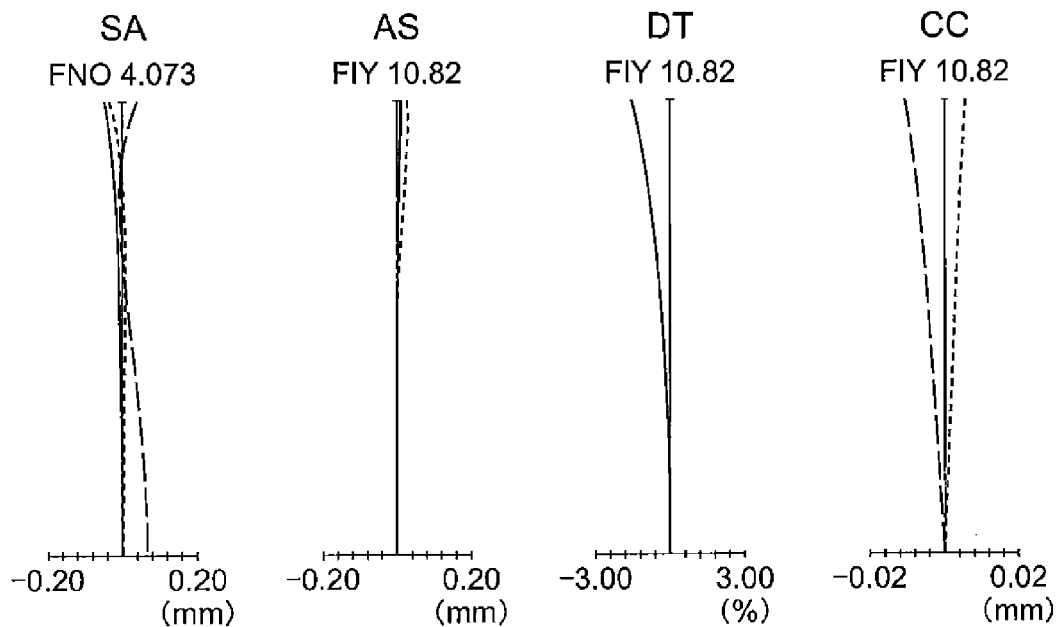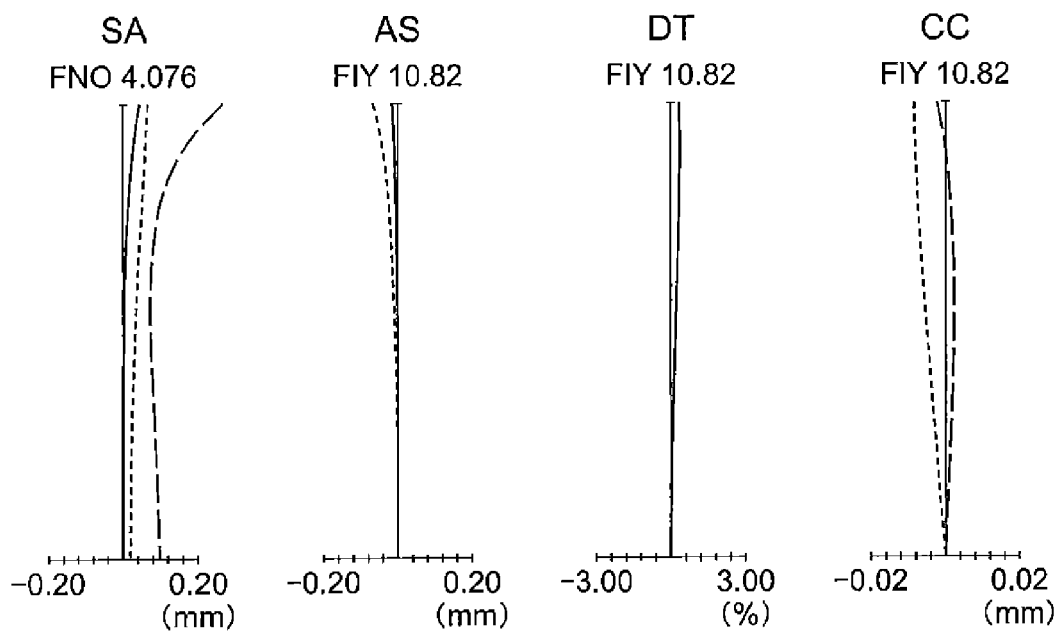

TELECONVERTER AND IMAGE PICKUP SYSTEM USING THE SAME

CROSS-REFERENCE TO RELATED APPLICATION

The present application is based upon and claims the benefit of priority from the prior Japanese Patent Application No. 2014-023339 filed on Feb. 10, 2014; the entire contents of which are incorporated herein by reference.

BACKGROUND OF THE INVENTION

Field of the Invention

The present invention relates to a teleconverter for achieving a lens system having a focal length longer than a focal length of a master lens apparatus, by mounting the master lens apparatus, and an image pickup system using the teleconverter.

Description of the Related Art

A rear teleconverter having a mount portion for a master lens apparatus, and a mount portion corresponding to each of mount portions of an image pickup apparatus main-body, in which, a converter lens portion is held between the master lens apparatus and the image pickup apparatus main-body via these mount portions, and which elongates a focal length of the overall lens system, has hitherto been known.

Here, it is preferable to include a lens unit in which, three lenses are cemented, including in order from an object side to an image side, a first lens having a negative refractive power, a second lens having a positive refractive power, and a third lens having a negative refractive power, at an intermediate portion of the converter lens section, as such an arrangement enables to reduce an effect of mutual decentering of lenses.

As a teleconverter which includes the lens unit in which, three lenses are cemented, at the intermediate portion of the converter lens section in such manner, teleconverters disclosed in Japanese Patent Application Laid-open Publication Nos. 2004-226648, 2005-107261, 2009-080176, 2011-081111, 2013-235217, and 2013-250291 are available.

SUMMARY OF THE INVENTION

A teleconverter according to an aspect of the present invention includes
a master lens apparatus side mount portion on which, a master lens apparatus is mounted,
an image pickup apparatus side mount portion on which, an image pickup apparatus main-body is mounted, and
a converter lens section having a negative refractive power as a whole, for achieving a lens system having a focal length longer than a focal length of the master lens apparatus, by mounting the master lens apparatus, and
the converter lens section includes in order from an object side to an image side,
a first lens unit having a positive refractive power,
a second lens unit having a negative refractive power, and
a third lens unit having a positive refractive power, and
the second lens unit is a lens unit in which, three lenses are cemented, and which includes in order from the object side to the image side,
a first lens having a negative refractive power,
a second lens having a positive refractive power, and
a third lens having a negative refractive power, and
the teleconverter satisfies the following conditional expressions (1-2), (2-2), and (3-2).

$$1.5 < |f|/D < 5.0 \tag{1-2}$$

$$-0.5 < (r22f+r22r)/(r22f-r22r) < -0.08 \tag{2-2}$$

$$1.55 < n2p < 1.65 \tag{3-2}$$

where,
f denotes a focal length of an overall system of the converter lens section,
D denotes a distance on an optical axis, from a lens surface nearest to an object of the converter lens section up to a lens surface nearest to an image of the converter lens section,
r22f denotes a paraxial radius of curvature of an object-side surface of the second lens in the second lens unit,
r22r denotes a paraxial radius of curvature of an image-side surface of the second lens in the second lens unit, and
n2p denotes a refractive index for a d-line of the second lens in the second lens unit.

Moreover, a teleconverter according to another aspect of the present invention includes
a master lens apparatus side mount portion on which, a master lens apparatus is mounted,
an image pickup apparatus side mount portion on which, an image pickup apparatus main-body is mounted, and
a converter lens section having a negative refractive power as a whole, for achieving a lens system having a focal length longer than a focal length of the master lens apparatus, by mounting the master lens apparatus, and
the converter lens section includes in order from an object side to an image side,
a first lens unit having a positive refractive power,
a second lens unit having a negative refractive power, and
a third lens unit having a positive refractive power, and
the second lens unit is a lens unit in which, three lenses are cemented, and which includes in order from the object side to the image side,
a first lens having a negative refractive power,
a second lens having a positive refractive power, and
a third lens having a negative refractive power, and
the teleconverter satisfies the following conditional expression (5-1).

$$-5.0 < r1r/f1 < -0.59 \tag{5-1}$$

where,
r1r denotes a paraxial radius of curvature of an image-side surface of a lens positioned nearest to an image in the first lens unit, and
f1 denotes a focal length of the first lens unit.

Moreover, a teleconverter according to still another aspect of the present invention includes
a master lens apparatus side mount portion on which, a master lens apparatus is mounted,
an image pickup apparatus side mount portion on which, an image pickup apparatus main-body is mounted, and
a converter lens section having a negative refractive power as a whole, for achieving a lens system having a focal length longer than a focal length of the master lens apparatus, by mounting the master lens apparatus, and
the converter lens section includes in order from an object side to an image side,
a first lens unit having a positive refractive power,
a second lens unit having a negative refractive power, and
a third lens unit having a positive refractive power, and the second lens unit is a lens unit in which, three lenses are cemented, and which includes in order from the object side to the image side, a first lens having a negative refractive power,
a second lens having a positive refractive power, and
a third lens having a negative refractive power, and
the teleconverter satisfies the following conditional expression (7-1).

$$0.33 < f23/f < 0.47 \quad (7\text{-}1)$$

where,
f23 denotes a focal length of the third lens in the second lens unit, and
f denotes a focal length of the overall system of the converter lens section.

Moreover, a teleconverter according to still another aspect of the present invention includes
a master lens apparatus side mount portion on which, a master lens apparatus is mounted,
an image pickup apparatus side mount portion on which, an image pickup apparatus main-body is mounted, and
a converter lens section having a negative refractive power as a whole, for achieving a lens system having a focal length longer than a focal length of the master lens apparatus, by mounting the master lens apparatus, and
the converter lens section includes only five lenses or six lenses, and
the converter lens section includes in order from an object side to an image side,
a first lens unit having a positive refractive power,
a second lens unit having a negative refractive power, and
a third lens unit having a positive refractive power, and
the first lens unit includes a biconvex positive lens, and
the second lens unit is a lens unit in which, three lenses are cemented, and which includes in order from the object side to the image side,
a first lens having a negative refractive power,
a second lens having a positive refractive power, and
a third lens having a negative refractive power.

Moreover, a teleconverter according to still another aspect of the present invention includes
a master lens apparatus side mount portion on which, a master lens apparatus is mounted,
an image pickup apparatus side mount portion on which, an image pickup apparatus main-body is mounted, and
a converter lens section having a negative refractive power as a whole, for achieving a lens system having a focal length longer than a focal length of the master lens apparatus, by mounting the master lens apparatus, and
the converter lens section includes only five lenses or six lenses, and
the converter lens section includes in order from an object side to an image side,
a first lens unit having a positive refractive power,
a second lens unit having a negative refractive power, and
a third lens unit having a positive refractive power, and
the second lens unit is a lens unit in which, three lenses are cemented, and which includes in order from the object side to the image side,
a first lens having a negative refractive power,
a second lens having a positive refractive power, and
a third lens having a negative refractive power, and
the teleconverter satisfies the following conditional expression (6-1).

$$0.32 < f22/|f| < 3.0 \quad (6\text{-}1)$$

where,
f22 denotes a focal length of the second lens in the second lens unit, and
f denotes a focal length of the overall system of the converter lens section.

Moreover, a teleconverter according to still another aspect of the present invention includes
a master lens apparatus side mount portion on which, a master lens apparatus is mounted,
an image pickup apparatus side mount portion on which, an image pickup apparatus main-body is mounted, and
a converter lens section having a negative refractive power as a whole, for achieving a lens system having a focal length longer than a focal length of the master lens apparatus, by mounting the master lens apparatus, and
the converter lens section includes only five lenses or six lenses, and
the converter lens section includes in order from an object side to an image side,
a first lens unit having a positive refractive power,
a second lens unit having a negative refractive power, and
a third lens unit having a positive refractive power, and
the second lens unit is a lens unit in which, three lenses are cemented, and which includes in order from the object side to the image side,
a first lens having a negative refractive power,
a second lens having a positive refractive power, and
a third lens having a negative refractive power, and
the teleconverter satisfies the following conditional expressions (1-1) and (2-1).

$$1.0 < |f|/D < 9.0 \quad (1\text{-}1)$$

$$-1.0 < (r22f + r22r)/(r22f - r22r) < -0.04 \quad (2\text{-}1)$$

where,
f denotes a focal length of the overall system of the converter lens section,
D denotes a distance on an optical axis, from a lens surface nearest to an object of the converter lens section up to a lens surface nearest to an image of the converter lens section,
r22f denotes a paraxial radius of curvature of an object-side surface of the second lens in the second lens unit, and
r22r denotes a paraxial radius of curvature of an image-side surface of the second lens in the second lens unit.

Moreover, an image pickup system according to still another aspect of the present invention includes
the teleconverter described above,
a master lens apparatus which can be mounted on a master lens apparatus side mount portion, and
an image pickup apparatus which can be mounted on an image pickup apparatus side mount portion, and
an image pickup apparatus main-body includes an image pickup element, and
the image pickup element is disposed at a position of an image formed by a combined optical system of the master lens apparatus and the teleconverter, and converts the image formed by the combined optical system to an electric signal.

BRIEF DESCRIPTION OF THE DRAWINGS

FIG. 1A and FIG. 1B are diagrams showing cross-sectional views of a master lens in a master lens apparatus, where, FIG. 1A shows an arrangement in a wide angle end state and FIG. 1B shows an arrangement in a telephoto end state;

FIG. 2 is a diagram showing a cross-sectional view of a teleconverter according to an example 1 of the present invention;

FIG. 8A, FIG. 8B, FIG. 8C, FIG. 8D, FIG. 8E, FIG. 8F, FIG. 8G, and FIG. 8H are various aberration diagrams of the master lens;

FIG. 9A, FIG. 9B, FIG. 9C, FIG. 9D, FIG. 9E, FIG. 9F, FIG. 9G, and FIG. 9H are various aberrations diagrams at the time of infinite object point focusing after the teleconverter according to the example 1 has been mounted on the master lens;

FIG. 10A, FIG. 10B, FIG. 10C, FIG. 10D, FIG. 10E, FIG. 10F, FIG. 10G, and FIG. 10H are various aberration diagrams at the time of infinite object point focusing after the teleconverter according to the example 2 has been mounted on the master lens;

FIG. 11A, FIG. 11B, FIG. 11C, FIG. 11D, FIG. 11E, FIG. 11F, FIG. 11G, and FIG. 11H are various aberration diagrams at the time of infinite object point focusing after the teleconverter according to the example 3 has been mounted on the master lens;

FIG. 12A, FIG. 12B, FIG. 12C, FIG. 12D, FIG. 12E, FIG. 12F, FIG. 12G, and FIG. 12H are various aberration diagrams at the time of infinite object point focusing after the teleconverter according to the example 4 has been mounted on the master lens;

FIG. 13A, FIG. 13B, FIG. 13C, FIG. 13D, FIG. 13E, FIG. 13F, FIG. 13G, and FIG. 13H are various aberration diagrams at the time of infinite object point focusing after the teleconverter according to the example 5 has been mounted on the master lens.

DETAILED DESCRIPTION OF THE INVENTION

Figure 3:
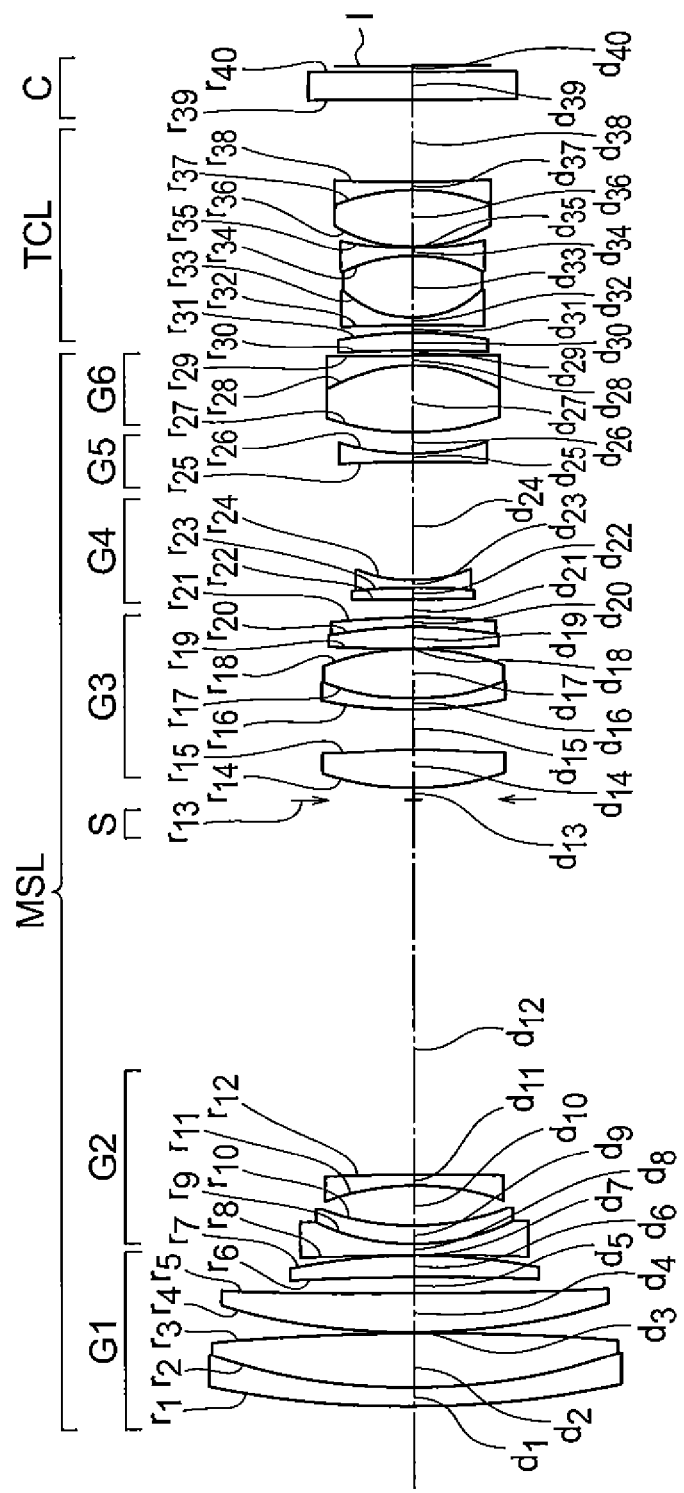
FIG. 3 is a diagram showing a lens cross-sectional view when the teleconverter according to the example 1 has been mounted on the master lens.

An action and an effect due to an arrangement of a teleconverter according to the present embodiment, and an image pickup system which includes such teleconverter, will be described below. However, the present invention is not restricted to the embodiment described below. In other words, the description of the embodiments includes many specific contents in detail for exemplification, and adding various variations to these contents in detail will be within the scope of the present invention. Accordingly, the exemplary embodiments of the present invention described below have been described without causing loss of generality with respect to the invention claimed, and without restricting the invention claimed.

The teleconverter according to the present embodiment, and the image pickup system which includes the teleconverter, will be described below.

The teleconverter according to the present embodiment includes a master lens apparatus side mount portion on which, a master lens apparatus is mounted, an image pickup apparatus side mount portion on which, an image pickup apparatus main-body is mounted, and a converter lens section having a negative refractive power as a whole, for achieving a lens system having a focal length longer than a focal length of the master lens apparatus, by mounting the master lens apparatus, and the converter lens section includes in order from an object side to an image side, a first lens unit having a positive refractive power,
a second lens unit having a negative refractive power,
a third lens unit having a positive refractive power, and the second lens unit is a lens unit in which, three lenses are cemented, and which includes in order from the object side to the image side, a first lens having a negative refractive power,
a second lens having a positive refractive power, and
a third lens having a negative refractive power.

According to such an arrangement, it is possible to reduce an effect of mutual decentering of the lenses in the second lens unit.

Moreover, in such an arrangement, the teleconverter satisfies the following conditional expression (1-2), (2-2), and (3-2).

$$1.5 < |f|/D < 5.0 \qquad (1\text{-}2)$$

$$-0.5 < (r22f + r22r)/(r22f - r22r) < -0.08 \qquad (2\text{-}2)$$

$$1.55 < n2p < 1.65 \qquad (3\text{-}2)$$

where, f denotes a focal length of an overall system of the converter lens section, D denotes a distance on an optical axis, from a lens surface nearest to an object of the converter lens section up to a lens surface nearest to an image of the converter lens section, r22f denotes a paraxial radius of curvature of an object-side surface of the second lens in the second lens unit, r22r denotes a paraxial radius of curvature of an image-side surface of the second lens in the second lens unit, and n2p denotes a refractive index for a d-line of the second lens in the second lens unit.

Conditional expression (1-2) is a conditional expression related to the focal length of the overall system of the converter lens section and the distance on the optical axis from the lens surface nearest to the object of the converter lens section up to a lens surface nearest to the image of the converter lens section.

For securing a desired magnification and reducing an occurrence of aberration, setting a refractive power (power) and a thickness of the converter lens section appropriately is important. Sometimes, on an outer covering of the converter lens section, an operating member such as a button for attaching and removing the teleconverter is disposed between the master lens apparatus side mount portion and the image pickup apparatus side mount portion. For this, it is preferable to have a certain amount of thickness.

Particularly, in a case of mounting the teleconverter on an image pickup apparatus having a short back focus, it may be an important problem. Consequently, for small-sizing of the teleconverter, the thickness of the converter lens section is to be made thinner even by a small amount. Therefore, it is preferable that the teleconverter satisfies conditional expression (1-2).

When falling below an upper limit value of conditional expression (1-2), in a case in which, the focal length of the overall system of the converter lens section is small, it is possible to secure a magnification of the teleconverter, or, in a case in which, the thickness of the teleconverter is large, it is possible to reduce an occurrence of aberration.

On the other hand, when exceeding a lower limit value of conditional expression (1-2), in a case in which, the focal length of the overall system of the converter lens section is long, it is possible to reduce the occurrence of aberration. Suppose, the number of lenses in the converter lens section is increased to reduce the occurrence of aberration, it is not preferable from a point of view of cost. Moreover, since the thickness of the converter lens section becomes large, it leads to an increase in the size.

Conditional expression (2-2) is a conditional expression related to a shape of the second lens having a positive refractive power in the second lens unit. In a case in which, the second lens in the second lens unit is a biconvex lens, when r22f and r22r are assumed to be r22f=−r22r, conditional expression (2-2) becomes 0. Consequently, conditional expression (2-2) indicates that an absolute value of the paraxial radius of curvature of the object-side surface of the second lens in the second lens unit is smaller than an absolute value of the paraxial radius of curvature of the image-side surface of the second lens in the second lens unit.

When falling below an upper limit value of conditional expression (2-2), an occurrence of a spherical aberration and a coma aberration is reduced.

On the other hand, when exceeding a lower limit value of conditional expression (2-2), an occurrence of an astigmatism is reduced, and an excessive correction of a curvature of field is suppressed. Moreover, securing edge thickness difference is facilitated, and it is possible to make the teleconverter small-sized.

Conditional expression (3-2) is a conditional expression related to a refractive index of the second lens having a positive refractive power in the second lens unit. The converter lens section, as a whole, has a negative refractive power. Therefore, for correcting Petzval's sum, it is desirable to make large a refractive index of a lens having a negative refractive power in the converter lens section, and to make low a refractive index of a lens having a positive refractive power in the converter lens section. Particularly, an effect on aberration is significant when the second lens in the second lens unit is let to be a lens having the largest positive refractive power.

When falling below an upper limit value of conditional expression (3-2), the refractive index of the lens having a negative refractive power is suppressed from becoming excessively large, and as a result of this, it is possible to use a low cost glass material.

On the other hand, when exceeding a lower limit value of conditional expression (3-2), securing the edge thickness difference is facilitated, and it is possible to suppress increasing the thickness for securing workability.

It is preferable that the teleconverter satisfies the following conditional expressions (1-3) and (1-4) instead of conditional expression (1-2).

$$1.6<|f|/D<4.0 \qquad (1\text{-}3)$$

$$1.8<|f|/D<3.0 \qquad (1\text{-}4)$$

Moreover, it is preferable that the teleconverter satisfies the following conditional expressions (2-3) and (2-4) instead of conditional expression (2-2).

$$-0.4<(r22f+r22r)/(r22f-r22r)<-0.10 \qquad (2\text{-}3)$$

$$-0.3<(r22f+r22r)/(r22f-r22r)<-0.15 \qquad (2\text{-}4)$$

Furthermore, it is more preferable that the teleconverter satisfies the following conditional expression (3-3) instead of conditional expression (3-2).

$$1.59<n2p<1.64 \qquad (3\text{-}3)$$

It is preferable that one of the first lens unit and the third lens unit includes at least one cemented lens.

Accordingly, correction of a chromatic aberration at a cemented surface becomes possible. Therefore, it is possible to reduce an occurrence of the chromatic aberration at each surface, and as a result of this, it is possible to reduce the occurrence of the chromatic aberration in the overall system.

Moreover, it is preferable that the cemented lens in one of the first lens unit and the third lens unit includes an object-side lens and an image-side lens, and satisfies the following conditional expression (4-1).

$$5<\Delta v<70 \qquad (4\text{-}1)$$

where, $\Delta v$ denotes a difference between Abbe's number for the object-side lens and Abbe's number for the image-side lens, and becomes even larger value in a case in which, there are two or more than two cemented lenses in one of the first lens unit and the third lens unit.

Conditional expression (4-1) is a conditional expression related to a case in which, the first lens unit and the third lens unit include a cemented lens. By satisfying conditional expression (4-1), it is possible to reduce the occurrence of the chromatic aberration at an object-side surface and an image-side surface of the second lens unit in particular.

When falling below an upper limit value of conditional expression (4-1), it is possible to select a glass material for which an abnormal dispersibility is not large. Accordingly, it is possible to suppress the cost from becoming high.

On the other hand, when exceeding a lower limit value of conditional expression (4-1), it becomes possible to cement lens surfaces effectively.

It is preferable to satisfy the following conditional expressions (4-2), (4-3), and (4-4) instead of conditional expression (4-1).

$$10<|\Delta v|<60 \qquad (4\text{-}2)$$

$$10<|\Delta v|<50 \qquad (4\text{-}3)$$

$$10<|\Delta v|<40 \qquad (4\text{-}4)$$

Moreover, it is preferable that the first lens unit includes one lens or two lenses.

By making the number of lenses small in such manner, it is possible to make the teleconverter small-sized.

Furthermore, it is preferable that the first lens unit includes a biconvex positive lens. Accordingly, since it is becomes easy to secure a space between the master lens apparatus and the first lens unit, it is preferable.

It is preferable that the third lens unit includes one lens or two lenses.

By making the number of lenses small in such manner, it is possible to make the teleconverter small-sized.

Moreover, it is preferable that the teleconverter satisfies the following conditional expression (5-1).

$$-5.0<r1r/f1<-0.59 \qquad (5\text{-}1)$$

where, r1r denotes a paraxial radius of curvature of an image-side surface of a lens positioned nearest to an image in the first lens unit, and f1 denotes a focal length of the first lens unit.

Conditional expression (5-1) is a conditional expression related to the paraxial radius of curvature of the image-side surface of the first lens unit. Aberrations such as the spherical aberration, the coma, and the astigmatism are susceptible to occur at the image-side surface of the first lens unit. As a result of this, a degradation of performance due to a manufacturing error is susceptible to occur. Therefore, by the teleconverter satisfying conditional expression (5-1), it becomes possible to carry out aberration correction favorably, while lowering sensitivity with respect to the manufacturing error.

When falling below an upper limit value of conditional expression (5-1), it is possible to suppress the sensitivity with respect to the manufacturing error to be excessively high, and to reduce an assembling cost.

On the other hand, when exceeding a lower limit value of conditional expression (5-1), it is possible to reduce an occurrence of aberration.

It is preferable that the teleconverter satisfies the following conditional expressions (5-2), (5-3), and (5-4) instead of conditional expression (5-1).

$$-3.0 < r1r/f1 < -0.61 \quad (5\text{-}2)$$

$$-2.0 < r1r/f1 < -0.62 \quad (5\text{-}3)$$

$$-1.0 < r1r/f1 < -0.63 \quad (5\text{-}4)$$

Moreover, it is preferable that the teleconverter satisfies the following conditional expression (6-1).

$$0.32 < f22/|f| < 3.0 \quad (6\text{-}1)$$

where, f22 denotes a focal length of the second lens in the second lens unit, and f denotes the focal length of the overall system of the converter lens section.

Conditional expression (6-1) is a conditional expression related to the focal length of the second lens in the second lens unit. The second lens in the second lens unit bears most of the positive refractive power of the converter lens section.

When falling below an upper limit value of conditional expression (6-1), it becomes easy to secure the edge thickness difference, and it is possible to make the teleconverter small-sized.

When exceeding a lower limit value of conditional expression (6-1), it is possible to reduce the occurrence of aberration in a balanced manner.

It is preferable that the teleconverter satisfies the following conditional expressions (6-2) and (6-3) instead of conditional expression (6-1).

$$0.327 < f22/|f| < 2.0 \quad (6\text{-}2)$$

$$0.33 < f22/|f| < 1.0 \quad (6\text{-}3)$$

Moreover, it is preferable that the teleconverter satisfies the following conditional expression (7-1).

$$0.33 < f23/f < 0.47 \quad (7\text{-}1)$$

where, f23 denotes a focal length of the third lens in the second lens unit, and f denotes the focal length of the overall system of the converter lens section.

Conditional expression (7-1) is a conditional expression related to the focal length of the third lens in the second lens unit. The first lens and the third lens share most of the negative refractive power of the converter lens section. Accordingly, it is possible to reduce the occurrence of aberration in a balanced manner, in the converter lens section as a whole.

When falling below an upper limit value of conditional expression (7-1), it is possible to secure the negative refractive power of the third lens sufficiently, and to suppress the negative refractive power of the first lens from becoming excessively large. As a result of this, it is possible to reduce an occurrence of the curvature of field. Moreover, it is possible to select a glass material having a comparatively lower refractive index. Therefore, it is possible to reduce a cost.

On the other hand, by exceeding a lower limit value of conditional expression (7-1), it is possible to suppress the negative refractive power of the third lens from becoming excessively large, and to reduce an occurrence of a distortion.

It is preferable that the teleconverter satisfies the following conditional expressions (7-2) and (7-3) instead of conditional expression (7-1).

$$0.33 < f23/f < 0.44 \quad (7\text{-}2)$$

$$0.33 < f23/f < 0.43 \quad (7\text{-}3)$$

Moreover, the teleconverter according to the present embodiment includes a master lens apparatus side mount portion on which, a master lens apparatus is mounted, an image pickup apparatus side mount portion on which, an image pickup apparatus main-body is mounted, and a converter lens section having a negative refractive power as a whole, for achieving a lens system having a focal length longer than a focal length of the master lens apparatus by mounting the master lens apparatus, and the converter lens section includes in order from an object side to an image side, a first lens unit having a positive refractive power, a second lens unit having a negative refractive power, and a third lens unit having a positive refractive power, and the second lens unit is a lens unit in which, three lenses are cemented, and which includes in order from the object side to the image side, a first lens having a negative refractive power, a second lens having a positive refractive power, and a third lens having a negative refractive power, and the teleconverter satisfies the following conditional expression (5-1).

$$-5.0 < r1r/f1 < -0.59 \quad (5\text{-}1)$$

where, r1r denotes a paraxial radius of curvature of an image-side surface of a lens positioned nearest to an image in the first lens unit, and f1 denotes a focal length of the first lens unit.

A technical significance of a basic arrangement, regarding conditional expression (5-1), is as already described.

Moreover, the teleconverter according to the present embodiment includes a master lens apparatus side mount portion on which, a master lens apparatus is mounted, an image pickup apparatus side mount portion on which, an image pickup apparatus main-body is mounted, and a converter lens section having a negative refractive power as a whole, for achieving a lens system having a focal length longer than a focal length of the master lens apparatus, by mounting the master lens apparatus, and the converter lens section includes in order from an object side to an image side, a first lens unit having a positive refractive power, a second lens unit having a negative refractive power, and a third lens unit having a positive refractive power, and the second lens unit is a lens unit in which, three lenses are cemented, and which includes in order from the object side to the image side, a first lens having a negative refractive power, a second lens having a positive refractive power, and a third lens having a negative refractive power, and the teleconverter satisfies the following conditional expression (7-1)

$$0.33 < f23/f < 0.47 \tag{7-1}$$

where, f23 denotes a focal length of the third lens in the second lens unit, and f denotes a focal length of the overall system of the converter lens section.

A technical significance of the basic arrangement, with regard to conditional expression (7-1), is as already described.

Moreover, the teleconverter according to the present embodiment includes a master lens apparatus side mount portion on which, a master lens apparatus is mounted, an image pickup apparatus side mount portion on which, an image pickup apparatus main-body is mounted, and a converter lens section having a negative refractive power as a whole, for achieving a lens system having a focal length longer than a focal length of the master lens apparatus, by mounting the master lens apparatus, and the converter lens section includes only five lenses or six lenses, and the converter lens section includes in order from an object side to an image side, a first lens unit having a positive refractive power, a second lens unit having a negative refractive power, and a third lens unit having a positive refractive power, and the first lens unit includes a biconvex positive lens, and the second lens unit is a lens unit in which, three lenses are cemented, and which includes in order from the object side to the image side, a first lens having a negative refractive power, a second lens having a positive refractive power, and a third lens having a negative refractive power.

A technical significance of the basic arrangement is as already described.

Moreover, the teleconverter according to the present embodiment includes a master lens apparatus side mount portion on which, a master lens apparatus is mounted, an image pickup apparatus side mount portion on which, an image pickup apparatus main-body is mounted, a converter lens section having a negative refractive power as a whole, for achieving a lens system having a focal length longer than a focal length of the master lens apparatus, by mounting the master lens apparatus, and the converter lens section includes only five lenses or six lenses, and the converter lens section includes in order from an object side to an image side, a first lens unit having a positive refractive power, a second lens unit having a negative refractive power, and a third lens unit having a positive refractive power, and the second lens unit is a lens unit in which, three lenses are cemented, and which includes in order from the object side to the image side, a first lens having a negative refractive power, a second lens having a positive refractive power, and a third lens having a negative refractive power, and the teleconverter satisfies the following conditional expression (6-1).

$$0.32 < f22/|f| < 3.0 \tag{6-1}$$

where, f22 denotes a focal length of the second lens in the second lens unit, and f denotes a focal length of the overall system of the converter lens section.

A technical significance of the basic arrangement, with regard to conditional expression (6-1), is as already described.

Moreover, it is preferable that the teleconverter satisfies the following conditional expression (1-1).

$$1.0 < |f|/D < 9.0 \tag{1-1}$$

where, f denotes the focal length of the overall system of the converter lens section, and D denotes a distance on the optical axis, from the lens surface nearest to the object of the converter lens section up to the lens surface nearest to the image of the converter lens section.

Description for conditional expression (1-1) is as already explained for conditional expression (1-2).

Regarding conditional expression (1-1), it is preferable to restrict as follows.

$$1.5 < |f|/D < 5.0 \tag{1-2}$$

$$1.6 < |f|/D < 4.0 \tag{1-3}$$

$$1.8 < |f|/D < 3.0 \tag{1-4}$$

Moreover, it is preferable that the teleconverter satisfies the following conditional expression (2-1).

$$-1.0 < (r22f + r22r)/(r22f - r22r) < -0.04 \tag{2-1}$$

where, r22f denotes a paraxial radius of curvature of an object-side surface of the second lens in the second lens unit, and r22r denotes a paraxial radius of curvature of an image-side surface of the second lens in the second lens unit.

Description for conditional expression (2-1) is as already explained for conditional expression (2-2).

Regarding conditional expression (2-1), it is preferable to restrict as follows.

$$-0.5 < (r22f + r22r)/(r22f - r22r) < -0.08 \tag{2-2}$$

$$-0.4 < (r22f + r22r)/(r22f - r22r) < -0.10 \tag{2-3}$$

$$-0.3 < (r22f + r22r)/(r22f - r22r) < -0.15 \tag{2-4}$$

Moreover, it is preferable that the teleconverter satisfies the following conditional expression (3-1).

$$1.55 < n2p < 1.70 \tag{3-1}$$

where, n2p denotes a refractive index for a d-line of the second lens in the second lens unit.

Description for conditional expression (3-1) is as already explained for conditional expression (3-2).

Regarding conditional expression (3-1), it is preferable to restrict as follows.

$$1.55 < n2p < 1.65 \tag{3-2}$$

$$1.59 < n2p < 1.64 \tag{3-3}$$

Moreover, it is preferable that one of the first lens unit and the third lens unit includes at least one cemented lens.

Accordingly, correction of the chromatic aberration becomes possible at a cemented surface. Therefore, it is possible to reduce the occurrence of chromatic aberration at each surface, and as a result of this, it is possible to reduce the occurrence of the chromatic aberration in the overall system.

Moreover, it is preferable that the cemented lens in one of the first lens unit and the third lens unit includes an object-side lens and an image side lens, and satisfies the following conditional expression (4-1).

$$5 < \Delta v < 70 \tag{4-1}$$

where, $\Delta v$ denotes a difference between Abbe's number for the object-side lens and Abbe's number for the image-side lens, and becomes even larger value in a case in which, there are two or more than two cemented lenses in one of the first lens unit and the third lens unit.

Description for conditional expression (4-1) is as already explained.

Moreover, the teleconverter according to the present embodiment includes a master lens apparatus side mount portion on which, a master lens apparatus is mounted, an image pickup apparatus side mount portion on which, an image pickup apparatus main-body is mounted, and a converter lens section having a negative refractive power as a whole, for achieving a lens system having a focal length longer than a focal length of the master lens apparatus, by mounting the master lens apparatus, and the converter lens section includes only five lenses or six lenses, and the converter lens section includes in order from an object side to an image side, a first lens unit having a positive refractive power, a second lens unit having a negative refractive power, and a third lens unit having a positive refractive power, and the second lens unit is a lens unit in which, three lenses are cemented, and which includes in order from the object side to the image side, a first lens having a negative refractive power, a second lens having a positive refractive power, and a third lens having a negative refractive power, and the teleconverter satisfies the following conditional expressions (1-1) and (2-1).

$$1.0 < |f|/D < 9.0 \tag{1-1}$$

$$-1.0 < (r22f + r22r)/(r22f - r22r) < -0.04 \tag{2-1}$$

where, f denotes a focal length of the overall system of the converter lens section, D denotes a distance on an optical axis, from a lens surface nearest to an object of the converter lens section up to a lens surface nearest to an image of the converter lens section, r22f denotes a paraxial radius of curvature of an object-side surface of the second lens in the second lens unit, and r22r denotes a paraxial radius of curvature of an image-side surface of the second lens in the second lens unit.

A technical significance of the basic arrangement, with regard to conditional expression (2-1), is as already described.

Moreover, it is preferable that the teleconverter satisfies the following conditional expression (3-1).

$$1.55 < n2p < 1.70 \tag{3-1}$$

where, n2p denotes a refractive index for a d-line of the second lens in the second lens unit.

Description for conditional expression (3-1) is as already explained for conditional expression (3-2).

Moreover, it is preferable that one of the first lens unit and the third lens unit includes at least one cemented lens.

Accordingly, correction of the chromatic aberration becomes possible at the cemented surface. Therefore, it is possible to reduce the occurrence of chromatic aberration at each surface, and as a result of this, it is possible to reduce the occurrence of chromatic aberration in the overall system.

Moreover, it is preferable that the cemented lens in one of the first lens unit and the third lens unit includes an object-side lens and an image-side lens, and satisfies the following conditional expression (4-1).

$$5 < \Delta v < 70 \tag{4-1}$$

where, $\Delta v$ denotes a difference between Abbe's number for the object-side lens and Abbe's number for the image-side lens, and becomes even larger value in a case in which, there are two or more than two cemented lenses in one of the first lens unit and the third lens unit.

Description for conditional expression (4-1) is as already explained.

Moreover, it is preferable that the first lens in the second lens unit is a biconcave negative lens, and the second lens in the second lens unit is a biconvex positive lens, and the third lens in the second lens unit is a biconcave negative lens.

Accordingly, formation of the cemented lens becomes easy.

Moreover, it is preferable that the teleconverter satisfies the following conditional expression (8-1).

$$1.585 < n1p < 1.830 \tag{8-1}$$

where, n1p denotes a refractive index of a lens having a positive refractive power which is positioned nearest to the object, in the first lens unit.

Conditional expression (8-1) is a conditional expression related to the refractive index of the lens having a positive refractive power which is positioned nearest to the object in the first lens unit. Since the converter lens section has a negative refractive power as a whole, for correcting Petzval's sum, it is desirable to make large a refractive index of a lens having a negative refractive power in the converter lens section, and to make small a refractive index of a lens having a positive refractive power in the converter lens section.

By a value falling below an upper limit value of conditional expression (8-1), the refractive index of the lens having a negative refractive power is suppressed from becoming excessively large, and as a result of this, it is possible to use a low cost glass material.

On the other hand, by exceeding a lower limit value of conditional expression (8-1), securing the edge thickness difference is facilitated, and it is possible to suppress increasing the thickness for securing workability.

It is preferable that the teleconverter satisfies the following conditional expressions (8-2) and (8-3) instead of conditional expression (8-1).

$$1.590 < n1p < 1.820 \tag{8-2}$$

$$1.590 < n1p < 1.810 \tag{8-3}$$

Moreover, it is preferable that the teleconverter satisfies the following conditional expression (9-1).

$$0.75 < r1r/f1 < 3.00 \tag{9-1}$$

where, r1r denotes a paraxial radius of curvature of an image-side surface of a lens positioned nearest to an image in the first lens unit, and f1 denotes a focal length of the first lens unit.

Conditional expression (9-1) is a conditional expression related to the paraxial radius of curvature of the image-side surface of the first lens unit. Aberrations such as the spherical aberration, the coma aberration, and the astigmatism are susceptible to occur at the image-side surface of the first lens unit. As a result of this, a degradation of performance due to a manufacturing error is susceptible to occur. Therefore, by the teleconverter satisfying conditional expression (9-1), it becomes possible to carry out aberration correction favorably while lowering sensitivity with respect to the manufacturing error.

When falling below an upper limit value of conditional expression (9-1), it is possible to suppress the sensitivity with respect to the manufacturing error from becoming excessively high, and to reduce an assembling cost.

On the other hand, when exceeding a lower limit value of conditional expression (9-1), it is possible to reduce an occurrence of aberration.

It is preferable that the teleconverter satisfies the following conditional expressions (9-2) and (9-3) instead of conditional expression (9-1).

$$0.90 < r1r/f1 < 2.00 \tag{9-2}$$

$$0.90 < r1r/f1 < 1.60 \tag{9-3}$$

Moreover, it is preferable that the teleconverter satisfies the following conditional expression (10-1).

$$0.41 < r22r/f < 0.62 \tag{10-1}$$

where, r22r denotes the paraxial radius of curvature of the image-side surface of the second lens in the second lens unit, and f denotes the focal length of the overall system of the converter lens section.

Accordingly, it is possible to reduce an effect of mutual decentering of lenses in an intermediate portion of the converter lens section, as well as to reduce sufficiently an occurrence of aberration.

It is preferable that the teleconverter satisfies the following conditional expressions (10-2), (10-3), and (10-4) instead of conditional expression (10-1).

$$0.44 < r22r/f < 0.60 \tag{10-2}$$

$$0.45 < r22r/f < 0.59 \tag{10-3}$$

$$0.46 < r22r/f < 0.58 \tag{10-4}$$

Moreover, it is preferable that the teleconverter satisfies the following conditional expression (11-1)

$$-2.00 < (r22r)/(r22f) < -1.18 \tag{11-1}$$

where, r22f denotes the paraxial radius of curvature of the object-side surface of the second lens in the second lens unit, and r22r denotes the paraxial radius of curvature of the image-side surface of the second lens in the second lens unit.

Conditional expression (11-1) is a conditional expression related to the shape of the second lens having a positive refractive power in the second lens unit.

When falling below an upper limit value of conditional expression (11-1), the occurrence of the spherical aberration and the coma aberration is reduced.

On the other hand, when exceeding a lower limit value of conditional expression (11-1), the occurrence of astigmatism is reduces as well as the excessive correction of the curvature of field is suppressed. Moreover, securing edge thickness difference is facilitated, and it is possible to make the teleconverter small-sized.

It is preferable that the teleconverter satisfies the following conditional expressions (11-2) and (11-3) instead of conditional expression (11-1).

$$-1.85 < (r22r)/(r22f) < -1.30 \tag{11-2}$$

$$-1.70 < (r22r)/(r22f) < -1.40 \tag{11-3}$$

Moreover, an image pickup system according to the present embodiment includes the aforementioned teleconverter, a master lens apparatus which can be mounted on a master lens apparatus side mount portion, and an image pickup apparatus which can be mounted on an image pickup apparatus side mount portion, and an image pickup apparatus main-body includes an image pickup element, and the image pickup element is disposed at a position of an image formed by a combined optical system of the master lens apparatus and the teleconverter, and converts the image formed by the combined optical system to an electric signal.

Accordingly, it is possible to provide a teleconverter in which, it is possible to reduce an effect of mutual decentering of lenses in an intermediate portion of the converter lens section, as well as to reduce sufficiently an occurrence of aberration, and an image pickup system which includes such teleconverter.

It is preferable that the aforementioned embodiments are satisfied simultaneously.

Moreover, regarding each conditional expression, by restricting the upper limit value and the lower limit value, a more assured effect can be achieved, and therefore it is preferable to restrict the upper limit value and the lower limit value of each conditional expression.

Examples of the teleconverter according to the present embodiment, and the image pickup system which includes the teleconverter will be described below.

To start with, a master lens MSL which is used in the teleconverter of the present embodiment will be described below.

FIG. 1A is a diagram showing a cross-sectional arrangement at a wide angle end of the master lens MSL, and FIG. 1B is a diagram showing a cross-sectional arrangement at a telephoto end of the master lens MSL.

The master lens MSL includes in order from an object side to an image side, a first lens unit G1 having a positive refractive power, a second lens unit G2 having a negative refractive power, a third lens unit G3 having a positive refractive power, a fourth lens unit G4 having a negative refractive power, a fifth lens unit G5 having a negative refractive power, and a sixth lens unit G6 having a positive refractive power. A stop S moves integrally with the third lens unit G3.

The first lens unit G1 includes in order from an object side to an image side, a cemented lens of a negative meniscus lens having a convex surface directed toward the object side and a biconvex positive lens, and a positive meniscus lens having a convex surface directed toward the object side.

The second lens unit G2 includes a positive meniscus lens having a convex surface directed toward the image side, a cemented lens of a biconcave negative lens and a positive meniscus lens having a convex surface directed toward the object side, and a negative meniscus lens having a convex surface directed toward the image side.

The third lens unit G3 includes a biconvex positive lens, a cemented lens of a negative meniscus lens having a convex surface directed toward the object side and a biconvex positive lens, and a cemented lens of a biconvex positive lens and a negative meniscus lens having a convex surface directed toward the image side.

The fourth lens unit G4 includes a cemented lens of planoconvex positive lens having a convex surface directed toward the image side and a biconcave negative lens.

The fifth lens unit G5 includes a biconcave negative lens.

The sixth lens unit G6 includes a cemented lens of a biconvex positive lens and a planoconcave negative lens having a concave surface directed toward the object side.

At the time of zooming from a wide angle end to a telephoto end, the first lens unit G1 is substantially fixed. The second lens unit G2 moves toward the image side. The third lens unit G3 is substantially fixed. The fourth lens unit G4 moves. The fifth lens unit G5 moves. The sixth lens unit G6 is substantially fixed.

An aspheric surface is used for four surfaces namely, both surfaces of the biconvex positive lens nearest to the object in the third lens unit G3, an image-side surface of the biconcave negative lens in the fourth lens unit G4, and an object-side surface of the biconvex positive lens in the sixth lens unit G6.

Next, teleconverter lenses TCL according to examples from an example 1 to an example 5 of the present embodiment will be described below. FIG. 2, and FIG. 4 to FIG. 7 are cross-sectional views along an optical axis upon spreading the teleconverter lenses TCL according to the examples from the example 1 to the example 5 of the present invention.

FIG. 2 is a cross-sectional view of the teleconverter lens TCL according to the example 1.

The teleconverter lens TCL according to the example 1 includes in order from an object side to an image side, a first lens unit G1 having a positive refractive power, a second lens unit G2 having a negative refractive power, and a third lens unit G3 having a positive refractive power. A flat and parallel plate immediately before an image plane I is a cover glass. The cover glass may be imparted a function of a filter.

The first lens unit G1 includes a positive meniscus lens L11 having a convex surface directed toward the image side.

The second lens unit G2 includes a cemented lens of a biconcave negative lens L21, a biconvex positive lens L22, and a biconcave negative lens L23.

The third lens unit G3 includes a cemented lens of a biconvex positive lens L31 and a biconcave negative lens L32.

FIG. 3 shows a lens cross-sectional arrangement along an optical axis when the teleconverter lens TCL according to the example 1 is mounted on the aforementioned master lens MSL. Details of an arrangement of a mount portion will be described later in an example of the image pickup system.

Figure 4:
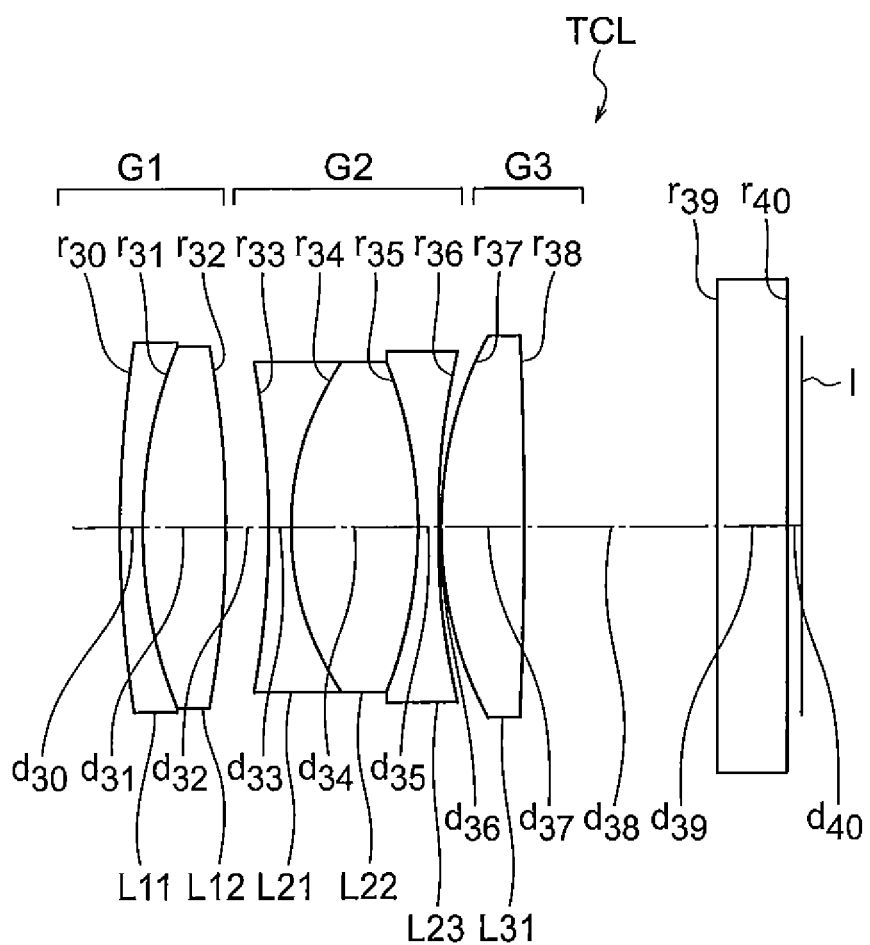
FIG. 4 is a diagram showing a cross-sectional view of a teleconverter according to an example 2 of the present invention.

FIG. 4 is a cross-sectional view of the teleconverter lens TCL according to the example 2.

The teleconverter lens TCL according to the example 2 includes in order from an object side to an image side, a first lens unit G1 having a positive refractive power, a second lens unit G2 having a negative refractive power, and a third lens unit G3 having a positive refractive power.

The first lens unit G1 includes a cemented lens of a negative meniscus lens L11 having a convex surface directed toward the object side and a biconvex positive lens L12.

The second lens unit G2 includes a cemented lens of a biconcave negative lens L21, a biconvex positive lens L22, and a biconcave negative lens L23.

The third lens unit G3 includes a biconvex positive lens L31.

Figure 5:
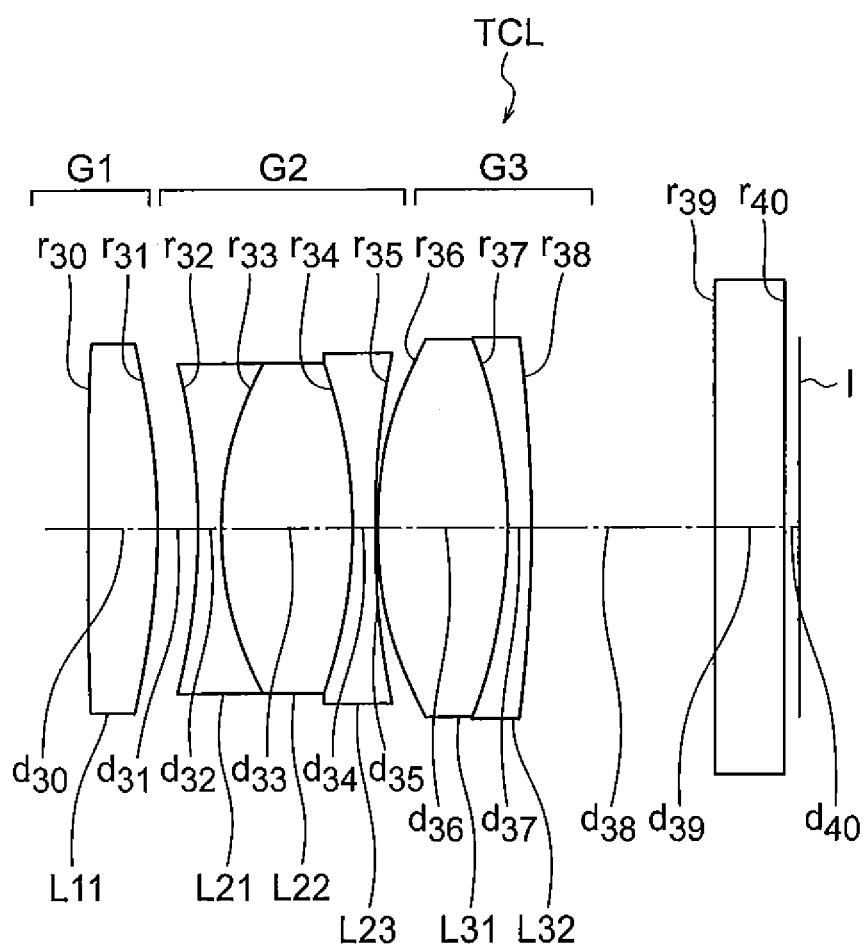
FIG. 5 is a diagram showing a cross-sectional view of a teleconverter according to an example 3 of the present invention.

FIG. 5 is a cross-sectional view of the teleconverter lens TCL according to the example 3.

The teleconverter lens TCL according to the example 3 includes in order from an object side to an image side, a first lens unit G1 having a positive refractive power, a second lens unit G2 having a negative refractive power, and a third lens unit G3 having a positive refractive power.

The first lens unit G1 includes a biconvex positive lens L11.

The second lens unit G2 includes a cemented lens of a biconcave negative lens L21, a biconvex positive lens L22, and a biconcave negative lens L23.

The third lens unit G3 includes a cemented lens of a biconvex positive lens L31 and a negative meniscus lens L32 having a convex surface directed toward the image side.

Figure 6:
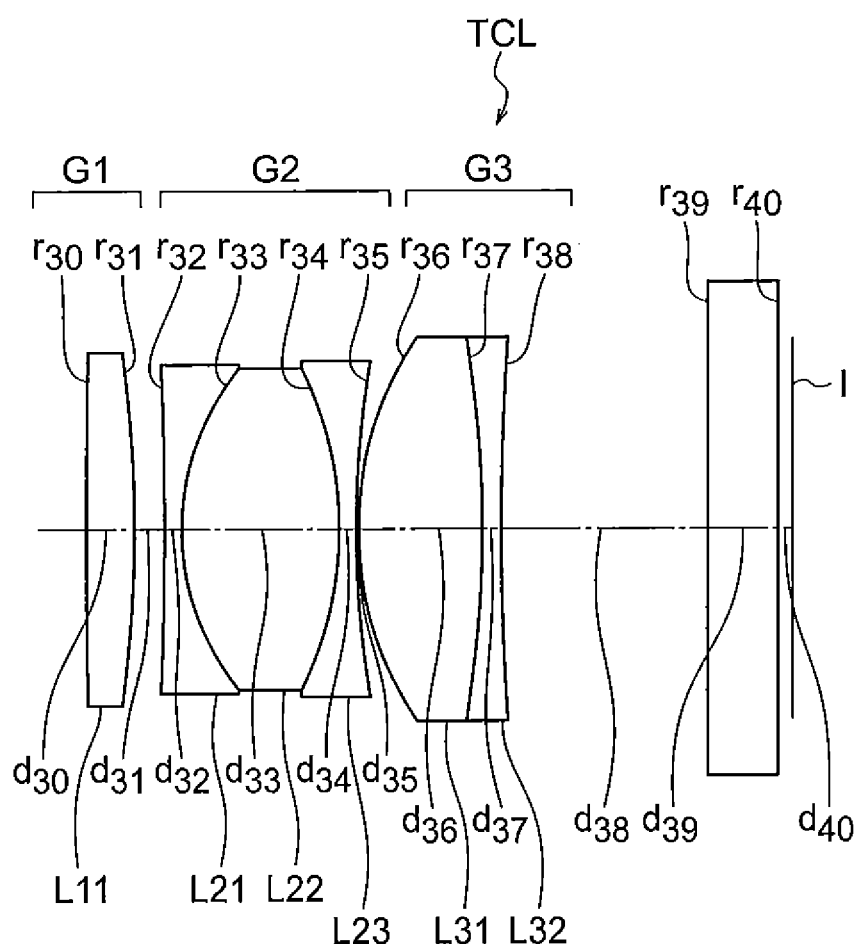
FIG. 6 is a diagram showing a cross-sectional view of a teleconverter according to an example 4 of the present invention.

FIG. 6 is a cross-sectional view of the teleconverter lens TCL according to the example 4.

The teleconverter lens TCL according to the example 4 includes in order from an object side to an image side, a first lens unit G1 having a positive refractive power, a second lens unit G2 having a negative refractive power, and a third lens unit G3 having a positive refractive power.

The first lens unit G1 includes a biconvex positive lens L11.

The second lens unit G2 includes a cemented lens of a biconcave negative lens L21, a biconvex positive lens L22, and a biconcave negative lens L23.

The third lens unit G3 includes a cemented lens of a biconvex positive lens L31 and a biconcave negative lens L32.

Figure 7:
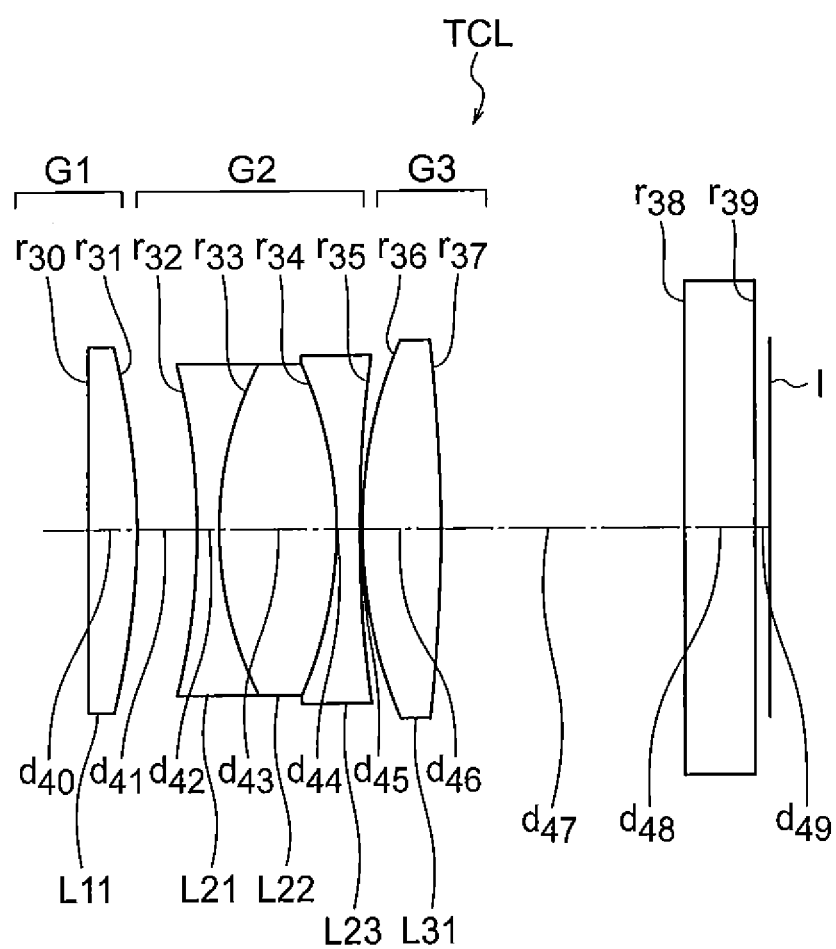
FIG. 7 is a diagram showing a cross-sectional view of a teleconverter according to an example 5 of the present invention.

FIG. 7 is a cross-sectional view of the teleconverter lens TCL according to the example 5.

The teleconverter lens TCL according to the example 5 includes in order from an object side to an image side, a first lens unit G1 having a positive refractive power, a second lens unit G2 having a negative refractive power, and a third lens unit G3 having a positive refractive power.

The first lens unit G1 includes a biconvex positive lens L11.

The second lens unit G2 includes a cemented lens of a biconcave negative lens L21, a biconvex positive lens L22, and a biconcave negative lens L23.

The third lens unit G3 includes a biconvex positive lens L31.

Numerical data of each of the abovementioned examples is shown below. Regarding symbols other than the aforementioned symbols, f denotes a focal length of the overall system, BF denotes a back focus, f1, f2, . . . denote focal lengths of lens systems respectively, IH denotes an image height, $F_{NO}$ denotes an F-number, ω denotes a half angle of view, WE denotes a wide angle end, TE denotes a telephoto end, r denotes a paraxial radius of curvature of each lens, d denotes a distance between two lens surfaces, nd denotes a refractive index for a d-line of each lens, and νd denotes Abbe's number for each lens. The overall length of lenses is a length obtained by adding the back focus to a distance from a front-most surface of the lens up to a rear-most surface of the lens. The BF (back focus) is expressed by air-converting a distance from the rear-most surface of the lens up to a paraxial image plane. An asterisk (*) mark is put next to a surface number of an aspheric surface.

Various data in numerical examples is data collected by assuming an image pickup system in which, the master lens apparatus having the master lens MSL has been mounted on the teleconverter lens TCL according to the examples from the example 1 to the example 5 respectively, and which includes a camera main-body in which, an image pickup surface is disposed at an image plane position.

The flat and parallel plate immediately before the image plane is a plate assuming a cover glass of an image pickup element or filters (such as a low-pass filter, a wavelength selection filter, and a dust filter), and is a plate substituted for an optically equivalent flat and parallel plate.

An aspheric surface shape is expressed by the following expression when Z is let to be an optical axis letting a direction of travel of light to be positive, and y is let to be a direction orthogonal to the optical axis.

$$Z = (y^2/r)/\left[1 + \{1 - (K+1)(y/r)^2\}^{1/2}\right] + A_4 y^4 + A_6 y^6 + A_8 y^8 + A_{10} y^{10}$$

where, r denotes a paraxial radius of curvature, K denotes a conical coefficient, $A_4$, $A_6$, $A_8$, and $A_{10}$ are aspheric coefficients of fourth order, sixth order, eighth order, and tenth order respectively. Moreover, in aspheric coefficients, '$E^{-n}$' (n is an integer) indicates '$10^{-n}$'.

Master Lens

| Unit mm | | | | |
|---|---|---|---|---|
| Surface data | | | | |
| Surface no. | r | d | nd | νd |
| 1 | 132.3375 | 2.6000 | 1.75520 | 27.51 |
| 2 | 82.5673 | 7.8400 | 1.49700 | 81.61 |
| 3 | −416.6091 | 0.1500 | | |
| 4 | 90.7260 | 5.4900 | 1.43875 | 94.93 |
| 5 | 505.9141 | d5(Variable) | | |
| 6 | −508.8493 | 3.0000 | 1.84666 | 23.78 |
| 7 | −91.3157 | 0.1500 | | |
| 8 | −494.7262 | 1.6000 | 1.49700 | 81.61 |
| 9 | 30.3801 | 2.5700 | 1.84666 | 23.78 |
| 10 | 34.4288 | 5.7600 | | |
| 11 | −37.0156 | 1.5000 | 1.80400 | 46.57 |
| 12 | −1277.2503 | d12(Variable) | | |
| 13(Stop) | ∞ | 1.7000 | | |
| 14* | 37.4087 | 5.4900 | 1.49700 | 81.61 |
| 15* | −95.1515 | 5.7900 | | |
| 16 | 62.6888 | 1.5000 | 1.76182 | 26.52 |
| 17 | 33.5342 | 7.0800 | 1.49700 | 81.61 |
| 18 | −35.3755 | 0.1500 | | |
| 19 | 170.5876 | 3.0800 | 1.59282 | 68.63 |
| 20 | −69.1970 | 1.3000 | 1.64769 | 33.79 |
| 21 | −143.0040 | d21(Variable) | | |
| 22 | ∞ | 1.7400 | 1.92286 | 18.90 |
| 23 | −79.8304 | 1.0000 | 1.74320 | 49.29 |
| 24* | 20.8000 | d24(Variable) | | |
| 25 | −220.9532 | 1.2000 | 1.59270 | 35.31 |
| 26 | 31.1472 | d26(Variable) | | |
| 27* | 31.3625 | 9.5900 | 1.80610 | 40.88 |
| 28 | −24.0000 | 1.5000 | 1.64769 | 33.79 |
| 29 | ∞ | 22.8000 | | |
| 30 | ∞ | 4.000 | 1.51633 | 64.14 |
| 31 | ∞ | 0.800 | | |
| Image plane | ∞ | | | |

Aspherical surface data

14th surface k = 0
A4 = −2.0856E−06, A6 = 7.5646E−09, A8 = 8.5023E−11,
A10 = −3.0217E−13

15th surface k = 0
A4 = 1.4855E−05, A6 = 9.4303E−09, A8 = 1.0450E−10,
A10 = −3.4344E−13

24th surface k = −0.6116
A4 = 3.8316E−06, A6 = 9.5787E−09, A8 = −2.1039E−11,
A10 = 0.0000E+00

27th surface k = −0.0172
A4 = −3.6348E−06, A6 = −4.7277E−09, A8 = 1.3666E−12,
A10 = 0.0000E+00

| | WE | TE |
|---|---|---|
| Unit separation | | |
| d5 | 2.37405 | 54.03064 |
| d12 | 53.60336 | 1.94673 |
| d21 | 2.66000 | 3.35411 |
| d24 | 17.40204 | 16.40901 |
| d26 | 2.75105 | 3.05003 |
| Various data (infinite) | | |
| Focal length | 40.81 | 147.00 |
| Fno | 2.88 | 2.88 |
| Angle of view(2ω) | 30.29° | 8.30° |
| Image height | 10.82 | * |
| BF | 26.238 | 26.238 (in air) |
| Lens total length | 176.899 | 176.899 (in air) |
| Unit focal length | | |
| f1 = 130.218 | | |
| f2 = −37.180 | | |
| f3 = 27.113 | | |
| f4 = −29.910 | | |
| f5 = −45.977 | | |
| f6 = 31.845 | | |

Teleconverter Lens

Example 1

Unit mm

Surface data

| Surface no. | r | d | nd | vd |
|---|---|---|---|---|
| 30 | −290.3757 | 2.6400 | 1.80518 | 25.46 |
| 31 | −57.8821 | 1.0400 | | |
| 32 | −324.6838 | 1.1000 | 1.80400 | 46.57 |
| 33 | 13.8612 | 8.7900 | 1.59270 | 35.31 |
| 34 | −22.2537 | 1.1000 | 1.83481 | 42.71 |
| 35 | 42.2116 | 0.2500 | | |
| 36 | 20.6554 | 8.1500 | 1.61340 | 44.27 |
| 37 | −28.9825 | 1.1000 | 1.84666 | 23.78 |
| 38 | 157.3317 | 11.8764 | | |
| 39 | ∞ | 4.0000 | 1.51633 | 64.14 |
| 40 | ∞ | 0.8000 | | |
| Image plane | ∞ | | | | a distance between the master lens and the teleconverter lens = 1.8574

Various data (an object point at infinity)

| | WE | TE |
|---|---|---|
| Focal length | 57.70 | 207.85 |
| Fno | 4.07 | 4.07 |
| Angle of view(2ω) | 21.63° | 5.96° |
| Image height | 10.82 | * |
| Magnification | 1.414 | * |
| BF | 15.31 | 15.31 (in air) |
| Lens total length | 192.00 | 192.00 (in air) |

Unit focal length f1 = 89.332
f2 = −19.305
f3 = 54.482

Teleconverter Lens

Example 2

Unit mm

Surface data

| Surface no. | r | d | nd | vd |
|---|---|---|---|---|
| 30 | 66.1837 | 1.3000 | 1.80400 | 46.57 |
| 31 | 26.9947 | 4.8200 | 1.59270 | 35.31 |
| 32 | −57.7478 | 2.4600 | | |
| 33 | −53.1517 | 1.2500 | 1.80400 | 46.57 |
| 34 | 16.1081 | 7.3400 | 1.59270 | 35.31 |
| 35 | −26.6610 | 1.2000 | 1.91082 | 35.25 |
| 36 | 42.0678 | 0.2000 | | |
| 37 | 22.6154 | 4.8600 | 1.48749 | 70.23 |
| 38 | −220.1280 | 11.0976 | | |
| 39 | ∞ | 4.000 | 1.51633 | 64.14 |
| 40 | ∞ | 0.800 | | |
| Image plane | ∞ | | | | a distance between the master lens and the teleconverter lens = 1.0000

Various data (an object point at infinity)

| | WE | TE |
|---|---|---|
| Focal length | 57.74 | 207.97 |
| Fno | 4.07 | 4.07 |
| Angle of view(2ω) | 21.47° | 5.92° |
| Image height | 10.82 | * |
| Magnification | 1.415 | * |
| BF | 14.54 | 14.54 (in air) |
| Lens total length | 189.63 | 189.63 (in air) |

Unit focal length f1 = 69.317
f2 = −14.863
f3 = 42.347

Teleconverter Lens

Example 3

Unit mm

Surface data

| Surface no. | r | d | nd | vd |
|---|---|---|---|---|
| 30 | 258.3931 | 3.9800 | 1.76182 | 26.52 |
| 31 | −44.5088 | 2.3500 | | |
| 32 | −39.2443 | 1.3000 | 1.83481 | 42.73 |
| 33 | 18.9163 | 7.6100 | 1.59270 | 35.31 |
| 34 | −28.3773 | 1.3000 | 1.83481 | 42.73 |
| 35 | 45.3792 | 0.1500 | | |
| 36 | 21.2989 | 7.5500 | 1.48749 | 70.23 |
| 37 | −30.4271 | 1.4000 | 1.90366 | 31.32 |
| 38 | −92.6162 | 10.6029 | | |
| 39 | ∞ | 4.000 | 1.51633 | 64.14 |
| 40 | ∞ | 0.800 | | |
| Image plane | ∞ | | | | a distance between the master lens and the teleconverter lens = 1.0000

Various data (an object point at infinity)

| | WE | TE |
|---|---|---|
| Focal length | 57.78 | 208.12 |
| Fno | 4.07 | 4.08 |
| Angle of view(2ω) | 21.65° | 5.96° |
| Image height | 10.82 | * |
| Magnification | 1.416 | * |
| BF | 14.04 | 14.04 (in air) |
| Lens total length | 191.34 | 191.34 (in air) |

Unit focal length f1 = 50.124
f2 = −15.019
f3 = 51.692

Teleconverter Lens

Example 4

Unit mm

Surface data

| Surface no. | r | d | nd | vd |
|---|---|---|---|---|
| 30 | 582.1291 | 2.7500 | 1.80518 | 25.46 |
| 31 | −69.9288 | 1.7000 | | |

-continued

Unit mm

| | | | | |
|---|---|---|---|---|
| 32 | −214.4283 | 1.0000 | 1.83481 | 42.73 |
| 33 | 14.4589 | 9.1000 | 1.59270 | 35.31 |
| 34 | −20.5671 | 1.0000 | 1.83481 | 42.73 |
| 35 | 55.6580 | 0.1500 | | |
| 36 | 19.5800 | 7.2000 | 1.48749 | 70.23 |
| 37 | −64.1276 | 1.1000 | 1.90366 | 31.32 |
| 38 | 157.6555 | 11.8649 | | |
| 39 | ∞ | 4.000 | 1.51633 | 64.14 |
| 40 | ∞ | 0.800 | | |
| Image plane | ∞ | | | | a distance between the master lens and the teleconverter lens = 1.0000

Various data (an object point at infinity)

| | WE | TE |
|---|---|---|
| Focal length | 57.79 | 208.17 |
| Fno | 4.08 | 4.08 |
| Angle of view(2ω) | 21.64° | 5.96° |
| Image height | 10.82 | * |
| Magnification | 1.416 | * |
| BF | 15.30 | 15.30 (in air) |
| Lens total length | 190.96 | 190.96 (in air) |

Unit focal length f1 = 77.681
f2 = −19.631
f3 = 70.362

Teleconverter Lens

Example 5

Unit mm

Surface data

| Surface no. | r | d | nd | vd |
|---|---|---|---|---|
| 30 | 541.5935 | 2.8500 | 1.59270 | 35.31 |
| 31 | −44.0512 | 3.4800 | | |
| 32 | −40.0189 | 1.2300 | 1.81600 | 46.62 |
| 33 | 20.3004 | 6.7900 | 1.59270 | 35.31 |
| 34 | −24.0499 | 1.3200 | 1.88300 | 40.76 |
| 35 | 64.0076 | 0.1900 | | |
| 36 | 26.9641 | 4.5800 | 1.48749 | 70.23 |
| 37 | −95.2503 | 14.0671 | | |
| 38 | ∞ | 4.000 | 1.51633 | 64.14 |
| 39 | ∞ | 0.800 | | |
| Image plane | ∞ | | | | a distance between the master lens and the teleconverter lens = 1.0000

Various data (an object point at infinity)

| | WE | TE |
|---|---|---|
| Focal length | 57.76 | 208.06 |
| Fno | 4.07 | 4.08 |
| Angle of view(2ω) | 21.54° | 5.93° |
| Image height | 10.82 | * |
| Magnification | 1.415 | * |
| BF | 17.51 | 17.51 (in air) |
| Lens total length | 189.61 | 189.61 (in air) |

-continued

Unit mm

Unit focal length f1 = 68.857
f2 = −16.212
f3 = 43.645

Aberration diagrams at the time of infinite object point focusing of the master lens MSL are shown in diagrams from FIG. 8A to FIG. 8H. Moreover, aberration diagrams at the time of infinite object point focusing of the teleconverter lenses TCL according to the examples from the example 1 to the example 5 are shown in diagrams from FIG. 9A to FIG. 13H. Moreover, in each diagram, 'FIY' denotes the maximum image height.

In these aberration diagrams, FIG. 9A, FIG. 10A, FIG. 11A, FIG. 12A, and FIG. 13A show a spherical aberration (SA) at the wide angle end, FIG. 9B, FIG. 10B, FIG. 11B, FIG. 12B, and FIG. 13B show an astigmatism (AS) at the wide angle end, FIG. 9C, FIG. 10C, FIG. 11C, FIG. 12C, and FIG. 13C show a distortion (DT) at the wide angle end, and FIG. 9D, FIG. 10D, FIG. 11D, FIG. 12D, and FIG. 13D show a chromatic aberration of magnification (CC) at the wide angle end.

Moreover, FIG. 9E, FIG. 10E, FIG. 11E, FIG. 12E, and FIG. 13E show a spherical aberration (SA) at the telephoto end, FIG. 9F, FIG. 10F, FIG. 11F, FIG. 12F, and FIG. 13F show an astigmatism (AS) at the telephoto end, FIG. 9G, FIG. 10G, FIG. 11G, FIG. 12G, and FIG. 13G show a distortion (DT) at the telephoto end, and FIG. 9H, FIG. 10H, FIG. 11H, FIG. 12H, and FIG. 13H show a chromatic aberration of magnification (CC) at the telephoto end.

Next, values of conditional expressions in each embodiments are described as below.

| Conditional expressions | Example1 | Example2 | Example3 |
|---|---|---|---|
| (1-2) \|f\|/D | 1.932 | 1.979 | 1.924 |
| (2-2) (r22f + r22r)/(r22f − r22r) | −0.232 | −0.247 | −0.200 |
| (3-2) n2p | 1.5927 | 1.5927 | 1.5927 |
| (4-1) Δν | 20.49 | 11.26 | 38.91 |
| (5-1) r1r/f1 | −0.648 | −0.833 | −0.888 |
| (6-1) f22/\|f\| | 0.339 | 0.390 | 0.413 |
| (7-1) f23/f | 0.371 | 0.383 | 0.421 |
| (8-1) n1p | 1.805 | 1.593 | 1.762 |
| (9-1) r1r/f | 1.240 | 1.245 | 0.902 |
| (10-1) r22r/f | 0.477 | 0.575 | 0.575 |
| (11-1) (r22r)/(r22f) | −1.605 | −1.655 | −1.500 |

| Conditional expressions | Example4 | Example5 |
|---|---|---|
| (1-2) \|f\|/D | 1.895 | 2.838 |
| (2-2) (r22f + r22r)/(r22f − r22r) | −0.174 | −0.085 |
| (3-2) n2p | 1.5927 | 1.5927 |
| (4-1) Δν | 38.91 | — |
| (5-1) r1r/f1 | −0.900 | −0.640 |
| (6-1) f22/\|f\| | 0.349 | 0.340 |
| (7-1) f23/f | 0.393 | 0.339 |
| (8-1) n1p | 1.805 | 1.593 |
| (9-1) r1r/f | 1.537 | 0.759 |
| (10-1) r22r/f | 0.452 | 0.415 |
| (11-1) (r22r)/(r22f) | −1.422 | −1.185 |

In the master lens MSL according to the present embodiment, for cutting off unnecessary light such as a ghost and a flare, a flare aperture may be disposed apart from the aperture stop. The flare aperture may be disposed at one of the locations such as on the object side of the first lens unit G1, between the first lens unit G1 and the second lens unit G2, between the second lens unit G2 and the third lens unit G3, between the third lens unit G3 and the fourth lens unit G4, between the fourth lens unit G4 and the fifth lens unit G5, between the fifth lens unit G5 and the sixth lens unit G6, and between the sixth lens unit G6 and the image plane I.

Moreover, an arrangement may be made to cut off flare light rays by a frame member, or some other member may be arranged. It may be printed or painted directly on an optical system, or a seal may be stuck directly. A shape of the flare aperture may be any shape such as a circular shape, an elliptical shape, a rectangular shape, a polygonal shape, and a range surrounded by a function curve. Not only unnecessary light beams, but also light beams such as coma flare around a screen may be cut off.

Moreover, the ghost and the flare may be reduced by applying an antireflection coating on each lens. Multicoating is desirable as it enables to reduce the ghost and the flare effectively. An infrared cutting coating may be used on a lens surface and the cover glass. Shading of brightness of a surrounding portion of an image may be reduced by shifting a micro lens of a CCD (charged coupled device). A design of the micro lens of the CCD may be changed according to an angle of incidence of a light ray for each image height. Moreover, an amount of degradation of light in the surrounding portion of the image may be corrected by image processing.

For preventing the generation of the ghost and the flare, an antireflection coating is generally applied on a surface in contact with air of a lens. However, a refractive index of an adhesive material on a cemented surface of a cemented lens is sufficiently larger than a refractive index of air. Therefore, in many cases, the reflectivity is of a level of a reflectivity of a single-layer coating basically, or lower than the reflectivity of the single-layer coating, and the coating is applied in few cases. However, if the antireflection coating is applied positively, also on a cemented surface, it is possible to reduce further the ghost and the flare, and a favorable image can be obtained. Particularly, glass materials having a large refractive index have been in widespread use nowadays, and have been heavily used due to a significant aberration correction effect. However, when a glass material having a large refractive index is used as a cemented lens, reflection at a cemented surface cannot be ignored. In such a case, applying the antireflection coating on the cemented surface in advance is particularly effective.

Effective methods of using a cemented surface coating have been disclosed in Japanese Patent Application Laid-open Publication Nos. Hei 2-27301, 2001-324676, 2005-92115, and U.S. Pat. No. 7,116,482. In these patent documents, the cemented surface coating in a first lens unit of a positive-lead zoom lens in particular, has been mentioned, and the method as disclosed in these patent documents is to be implemented for the cemented lens surfaces in the first lens unit according to the present invention.

As a coating material to be used, according to a refractive index of an adhesive material and a refractive index of the lens which is a base, coating materials such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ having a comparatively larger refractive index, and coating materials such as $MgF_2$, $SiO_2$, and $Al_2O_3$ having a comparatively lower refractive index are to be selected appropriately, and to be set to a film thickness which satisfies phase conditions.

Naturally, similar to the coating on a surface of a lens in contact with air, the coating on the cemented surface may also be let to be a multi coating. By combining appropriately a film thickness and a coating material of number of films not less than in two layers, it is possible to reduce further the reflectance, and to control spectral characteristics and angular characteristics. Moreover, it is needless to mention that for the cemented surface of lenses other than the lenses in the first lens unit, it is effective to apply the coating on the cemented surface based on a similar concept.

Figure 14:
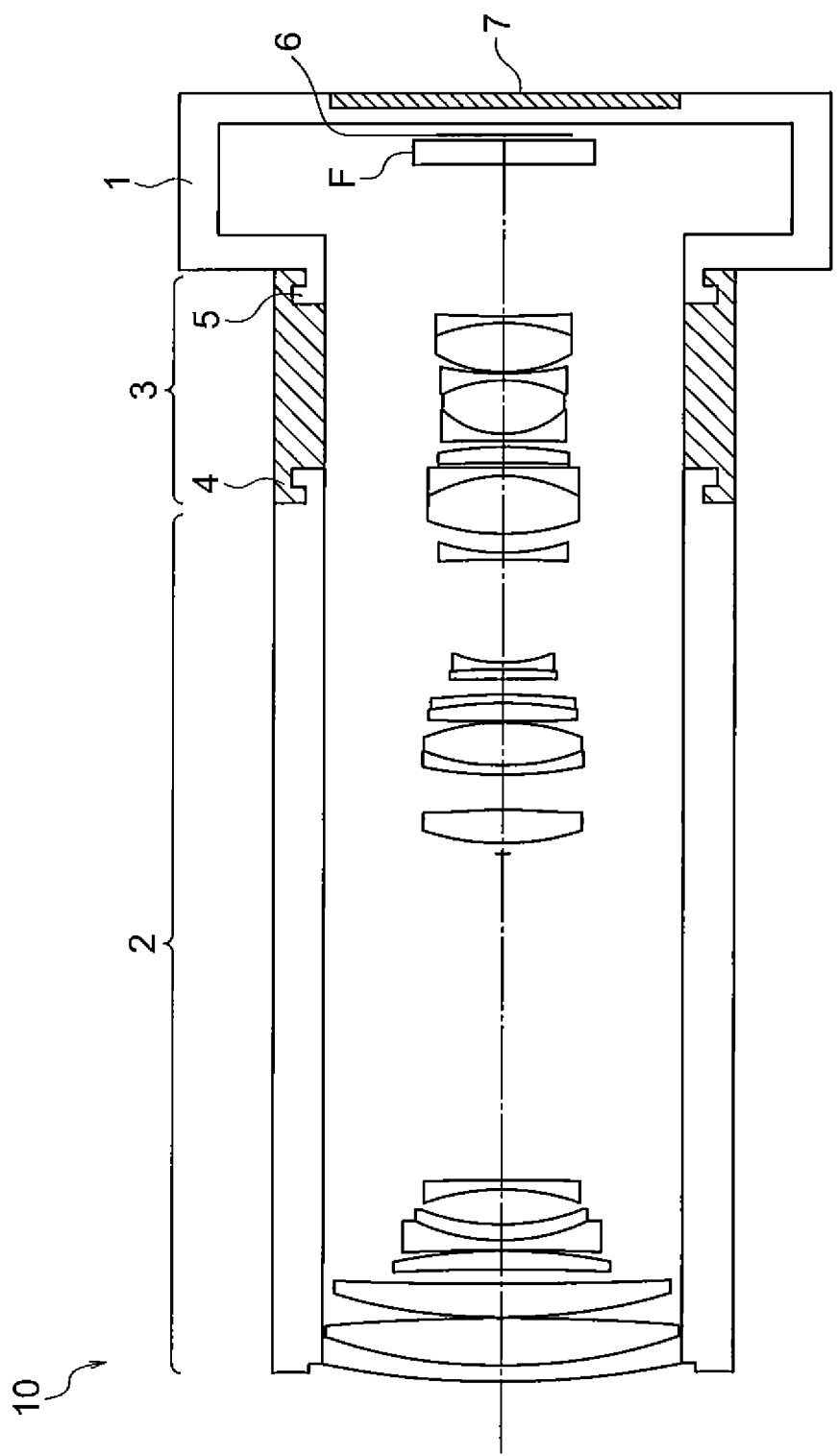
FIG. 14 is a schematic diagram showing important sections in an image pickup system according to the examples.

FIG. 14 is a schematic cross-sectional view of an image pickup system in which, the teleconverter according to the present embodiment and the master lens apparatus have been combined as used in a taking lens. A lens section has been indicated schematically, and a lens system such as the aforementioned lens system can be used.

In FIG. 14, an image pickup system 10 is a camera which includes an image pickup apparatus main-body 1, but does not have a quick-return mirror in an optical path. A master lens apparatus side mount portion 4 is formed on a side of a teleconverter section 3, toward the master lens apparatus 2. An image pickup apparatus side mount portion 5 is formed on a side of the teleconverter section 3, toward the image-pickup apparatus main-body 1.

Accordingly, the teleconverter section 3 can be detachably formed between the master lens apparatus 2 and the image pickup apparatus main-body 1.

As a type of the mount portion, various types of mounts such as a screw-type mount, and bayonet-type mount are used (in FIG. 14, bayonet-type mount is used).

Moreover, an image of an object is formed on an image pickup surface of an image pickup element of a CCD and a C-MOS (complementary metal-oxide semiconductor) by the master lens apparatus MSL and the teleconverter lens TCL. The image pickup element is disposed at a position of an image formed by a combined optical system of the master lens apparatus 2 and the teleconverter section 3, and converts the image formed by the combined optical system to an electric signal.

Furthermore, a cover glass and a filter F is disposed immediately before an image pickup surface I.

Moreover, a back monitor 7 is formed on a rear surface of the image pickup apparatus main-body 1. A photographer is able to make out a composition to be picked from an image displayed on the back monitor 7.

Furthermore, an arrangement may be made to transmit information related to an arrangement of lens units disposed in the master lens apparatus 2, to the image pickup apparatus main-body 1. For instance, the master lens apparatus 2 includes a movable lens for focusing, and is capable of correcting a shift in an image position due to an object distance, the teleconverter section 3, and a type of the image pickup apparatus main-body 1.

The teleconverter according to the present embodiment can be used as an optical system (rear teleconverter) of an image pickup system having such arrangement.

Various embodiments of the present invention have been described heretofore. However, the present invention is not restricted to the embodiments described heretofore, and embodiments arranged by combining appropriately the arrangements of the aforementioned embodiments are also within the scope of the present invention.

As described heretofore, the teleconverter which includes a lens unit in which, three lenses are cemented, is useful as a teleconverter which is capable of reducing the effect of mutual decentering of lenses in the intermediate portion of the converter lens section, as well as to reduce sufficiently an occurrence of aberration.

By the teleconverter which includes a lens unit in which three lenses are cemented, an effect is shown that it is possible to provide a teleconverter which is capable of reducing an effect of mutual decentering of lenses in an intermediate portion of the converter lens section, as well as to reduce sufficiently an occurrence of aberration, and an image pickup system which includes such teleconverter.

What is claimed is:

1. A teleconverter comprising:
a master lens apparatus side mount portion on which, a master lens apparatus is mounted;
an image pickup apparatus side mount portion on which, an image pickup apparatus main-body is mounted; and
a converter lens section having a negative refractive power as a whole, for achieving a lens system having a focal length longer than a focal length of the master lens apparatus, by mounting the master lens apparatus, wherein
the converter lens section includes in order from an object side to an image side,
a first lens unit having a positive refractive power,
a second lens unit having a negative refractive power, and
a third lens unit having a positive refractive power, and
the second lens unit is a lens unit in which, three lenses are cemented, and which includes in order from the object side to the image side,
a first lens having a negative refractive power,
a second lens having a positive refractive power, and
a third lens having a negative refractive power, and
the teleconverter satisfies the following conditional expressions (1-2), (2-2), and (3-2)

$$1.5 < |f|/D < 5.0 \tag{1-2}$$

$$-0.5 < (r22f + r22r)/(r22f - r22r) < -0.08 \tag{2-2}$$

$$1.55 < n2p < 1.65 \tag{3-2}$$

where,
f denotes a focal length of an overall system of the converter lens section,
D denotes a distance on an optical axis, from a lens surface nearest to an object of the converter lens section up to a lens surface nearest to an image of the converter lens section,
r22f denotes a paraxial radius of curvature of an object-side surface of the second lens in the second lens unit,
r22r denotes a paraxial radius of curvature of an image-side surface of the second lens in the second lens unit, and
n2p denotes a refractive index for a d-line of the second lens in the second lens unit.

2. The teleconverter according to claim 1, wherein the first lens unit includes one lens or two lenses.

3. The teleconverter according to claim 1, wherein the first lens unit includes a biconvex positive lens.

4. The teleconverter according to claim 1, wherein the third lens unit includes one lens or two lenses.

5. The teleconverter according to claim 1, wherein the teleconverter satisfies the following conditional expression (5-1)

$$-5.0 < r1r/f1 < -0.59 \tag{5-1}$$

where,
r1r denotes a paraxial radius of curvature of an image-side surface of a lens positioned nearest to an image in the first lens unit, and
f1 denotes a focal length of the first lens unit.

6. The teleconverter according to claim 1, wherein the teleconverter satisfies the following conditional expression (6-1)

$$0.32 < f22/|f| < 3.0 \tag{6-1}$$

where,
f22 denotes a focal length of the second lens in the second lens unit, and
f denotes the focal length of the overall system of the converter lens section.

7. The teleconverter according to claim 1, wherein the teleconverter satisfies the following conditional expression (7-1)

$$0.33 < f23/f < 0.47 \tag{7-1}$$

where,
f23 denotes a focal length of the third lens in the second lens unit, and
f denotes the focal length of the overall system of the converter lens section.

8. An image pickup system comprising:
a teleconverter according to claim 1;
a master lens apparatus which can be mounted on a master lens apparatus side mount portion; and
an image pickup apparatus which can be mounted on an image pickup apparatus side mount portion, wherein
an image pickup apparatus main-body includes an image pickup element, and
the image pickup element is disposed at a position of an image formed by a combined optical system of the master lens apparatus and the teleconverter, and converts the image formed by the combined optical system, to an electric signal.

9. The teleconverter according to claim 1, wherein one of the first lens unit and the third lens unit includes at least one cemented lens.

10. The teleconverter according to claim 9, wherein
the cemented lens in one of the first lens unit and the third lens unit includes an object-side lens and an image-side lens, and
satisfies the following conditional expression (4-1)

$$5 < \Delta v < 70 \tag{4-1}$$

where,
$\Delta v$ denotes a difference between Abbe's number for the object-side lens and Abbe's number for the image-side lens, and becomes even larger value in a case in which, there are two or more than two cemented lenses in one of the first lens unit and the third lens unit.

11. A teleconverter comprising:
a master lens apparatus side mount portion on which, a master lens apparatus is mounted;
an image pickup apparatus side mount portion on which, an image pickup apparatus main-body is mounted; and
a converter lens section having a negative refractive power as a whole, for achieving a lens system having a focal length longer than a focal length of the master lens apparatus, by mounting the master lens apparatus, wherein
the converter lens section includes in order from an object side to an image side,
a first lens unit having a positive refractive power,
a second lens unit having a negative refractive power, and
a third lens unit having a positive refractive power, and
the second lens unit is a lens unit in which, three lenses are cemented, and which includes in order from the object side to the image side, a first lens having a negative refractive power,
a second lens having a positive refractive power, and
a third lens having a negative refractive power, and
the teleconverter satisfies the following conditional expression (5-1)

$$-5.0 < r1r/f1 < -0.59 \quad (5-1)$$

where,
r1r denotes a paraxial radius of curvature of an image-side surface of a lens positioned nearest to an image in the first lens unit, and
f1 denotes a focal length of the first lens unit.

12. The teleconverter according to claim 11, wherein the teleconverter satisfies the following conditional expression (1-1)

$$1.0 < |f|/D < 9.0 \quad (1-1)$$

where,
f denotes the focal length of the overall system of the converter lens section, and
D denotes a distance on the optical axis, from the lens surface nearest to the object of the converter lens section up to the lens surface nearest to the image of the converter lens section.

13. The teleconverter according to claim 11, wherein the teleconverter satisfies the following conditional expression (2-1)

$$-1.0 < (r22f+r22r)/(r22f-r22r) < -0.04 \quad (2-1)$$

where,
r22f denotes a paraxial radius of curvature of an object-side surface of the second lens in the second lens unit, and
r22r denotes a paraxial radius of curvature of an image-side surface of the second lens in the second lens unit.

14. The teleconverter according to claim 11, wherein the teleconverter satisfies the following conditional expression (3-1)

$$1.55 < n2p < 1.70 \quad (3-1)$$

where,
n2p denotes a refractive index for a d-line of the second lens in the second lens unit.

15. The teleconverter according to claim 11, wherein
the first lens in the second lens unit is a biconcave negative lens, and
the second lens in the second lens unit is a biconvex positive lens, and
the third lens in the second lens unit is a biconcave negative lens.

16. The teleconverter according to claim 11, wherein one of the first lens unit and the third lens unit includes at least one cemented lens.

17. The teleconverter according to claim 16, wherein
the cemented lens in one of the first lens unit and the third lens unit includes an object-side lens and an image-side lens, and
satisfies the following conditional expression (4-1)

$$5 < \Delta v < 70 \quad (4-1)$$

where,
$\Delta v$ denotes a difference between Abbe's number for the object-side lens and Abbe's number for the image-side lens, and becomes even larger value in a case in which, there are two or more than two cemented lenses in one of the first lens unit and the third lens unit.

18. A teleconverter comprising:
a master lens apparatus side mount portion on which, a master lens apparatus is mounted;
an image pickup apparatus side mount portion on which, an image pickup apparatus main-body is mounted; and
a converter lens section having a negative refractive power as a whole, for achieving a lens system having a focal length longer than a focal length of the master lens apparatus, by mounting the master lens apparatus, wherein
the converter lens section includes in order from an object side to an image side,
a first lens unit having a positive refractive power,
a second lens unit having a negative refractive power, and
a third lens unit having a positive refractive power, and
the second lens unit is a lens unit in which, three lenses are cemented, and which includes in order from the object side to the image side,
a first lens having a negative refractive power,
a second lens having a positive refractive power, and
a third lens having a negative refractive power, and
the teleconverter satisfies the following conditional expression (7-1)

$$0.33 < f23/f < 0.47 \quad (7-1)$$

where,
f23 denotes a focal length of the third lens in the second lens unit, and
f denotes a focal length of the overall system of the converter lens section.

19. A teleconverter comprising:
a master lens apparatus side mount portion on which, a master lens apparatus is mounted;
an image pickup apparatus side mount portion on which, an image pickup apparatus main-body is mounted; and
a converter lens section having a negative refractive power as a whole, for achieving a lens system having a focal length longer than a focal length of the master lens apparatus, by mounting the master lens apparatus, wherein
the converter lens section includes only five lenses or six lenses, and
the converter lens section includes in order from an object side to an image side,
a first lens unit having a positive refractive power,
a second lens unit having a negative refractive power, and
a third lens unit having a positive refractive power, and
the first lens unit includes a biconvex positive lens, and
the second lens unit is a lens unit in which, three lenses are cemented, and which includes in order from the object side to the image side,
a first lens having a negative refractive power,
a second lens having a positive refractive power, and
a third lens having a negative refractive power.

20. A teleconverter comprising:
a master lens apparatus side mount portion on which, a master lens apparatus is mounted;
an image pickup apparatus side mount portion on which, an image pickup apparatus main-body is mounted; and
a converter lens section having a negative refractive power as a whole, for achieving a lens system having a focal length longer than a focal length of the master lens apparatus, by mounting the master lens apparatus, wherein
the converter lens section includes only five lenses or six lenses, and the converter lens section includes in order from an object side to an image side,
a first lens unit having a positive refractive power,
a second lens unit having a negative refractive power, and
a third lens unit having a positive refractive power, and
the second lens unit is a lens unit in which, three lenses are cemented, and which includes in order from the object side to the image side,
a first lens having a negative refractive power,
a second lens having a positive refractive power, and
a third lens having a negative refractive power, and
the teleconverter satisfies the following conditional expression (6-1)

$$0.32<f22/|f|<3.0 \qquad (6\text{-}1)$$

where,
f22 denotes a focal length of the second lens in the second lens unit, and
f denotes a focal length of the overall system of the converter lens section.

21. A teleconverter comprising:
a master lens apparatus side mount portion on which, a master lens apparatus is mounted;
an image pickup apparatus side mount portion on which, an image pickup apparatus main-body is mounted; and
a converter lens section having a negative refractive power as a whole, for achieving a lens system having a focal length longer than a focal length of the master lens apparatus, by mounting the master lens apparatus, wherein
the converter lens section includes only five lenses or six lenses, and
the converter lens section includes in order from an object side to an image side,
a first lens unit having a positive refractive power,
a second lens unit having a negative refractive power, and
a third lens unit having a positive refractive power, and
the second lens unit is a lens unit in which, three lenses are cemented, and which includes in order from the object side to the image side,
a first lens having a negative refractive power,
a second lens having a positive refractive power, and
a third lens having a negative refractive power, and
the teleconverter satisfies the following conditional expressions (1-1) and (2-1)

$$1.0<|f|/D<9.0 \qquad (1\text{-}1)$$

$$-1.0<(r22f+r22r)/(r22f-r22r)<-0.04 \qquad (2\text{-}1)$$

where,
f denotes a focal length of the overall system of the converter lens section,
D denotes a distance on an optical axis, from a lens surface nearest to an object of the converter lens section up to a lens surface nearest to an image of the converter lens section,
r22f denotes a paraxial radius of curvature of an object-side surface of the second lens in the second lens unit, and
r22r denotes a paraxial radius of curvature of an image-side surface of the second lens in the second lens unit.

22. The teleconverter according to claim 21, wherein the teleconverter satisfies the following conditional expression (3-1)

$$1.55<n2p<1.70 \qquad (3\text{-}1)$$

where,
n2p denotes a refractive index for a d-line of the second lens in the second lens unit.

23. The teleconverter according to claim 21, wherein one of the first lens unit and the third lens unit includes at least one cemented lens.

24. The teleconverter according to claim 23, wherein
the cemented lens in one of the first lens unit and the third lens unit includes an object-side lens and an image-side lens, and
satisfies the following conditional expression (4-1)

$$5<\Delta v<70 \qquad (4\text{-}1)$$

where,
$\Delta v$ denotes a difference between Abbe's number for the object-side lens and Abbe's number for the image-side lens, and becomes even larger value in a case in which, there are two or more than two cemented lenses in one of the first lens unit and the third lens unit.

* * * * *